US012802412B2

(12) United States Patent
Byun et al.

(10) Patent No.: US 12,802,412 B2
(45) Date of Patent: Nov. 17, 2026

(54) METHOD OF TRAINING OBJECT RECOGNITION MODEL BY USING SPATIAL INFORMATION AND COMPUTING DEVICE FOR PERFORMING THE METHOD

(71) Applicant: Samsung Electronics Co., Ltd., Suwon-si (KR)

(72) Inventors: Dongnam Byun, Suwon-si (KR); Dongchan Kim, Suwon-si (KR); Jaewook Shin, Suwon-si (KR); Jinyoung Hwang, Suwon-si (KR); Sejin Kwak, Suwon-si (KR); Geunho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 18/487,374

(22) Filed: Oct. 16, 2023

(65) Prior Publication Data

US 2024/0119709 A1 Apr. 11, 2024

Related U.S. Application Data

(63) Continuation of application No. PCT/KR2023/015313, filed on Oct. 5, 2023.

(30) Foreign Application Priority Data

Oct. 7, 2022 (KR) ........................ 10-2022-0129042
Nov. 16, 2022 (KR) ........................ 10-2022-0153955

(51) Int. Cl.
*G06V 10/774* (2022.01)
*G06T 11/26* (2026.01)
(Continued)

(52) U.S. Cl.
CPC ............ *G06V 10/774* (2022.01); *G06T 11/26* (2026.01); *G06V 10/26* (2022.01); *G06V 10/60* (2022.01);
(Continued)

(58) Field of Classification Search
CPC ...... G06V 10/774; G06V 10/26; G06V 10/60; G06V 10/74; G06V 10/82; G06V 20/50;
(Continued)

(56) References Cited

U.S. PATENT DOCUMENTS 10,845,819 B2 11/2020 Park et al.
10,921,806 B2 2/2021 Kim et al.
(Continued)

FOREIGN PATENT DOCUMENTS

CN 109008810 A 12/2018
JP 2020/052032 A 4/2020
(Continued)

OTHER PUBLICATIONS

International Search Report dated Jan. 10, 2024, issued in International Application No. PCT/KR2023/015313.
(Continued)

*Primary Examiner* — Matthew C Bella
*Assistant Examiner* — Andrew B. Jones
(74) *Attorney, Agent, or Firm* — Jefferson IP Law, LLP

(57) ABSTRACT

A method of training an object recognition model by using spatial information is provided. The method includes obtaining spatial information including illumination information corresponding to a plurality of spots in a space, obtaining illumination information corresponding to at least one spot of the plurality of spots from the spatial information, obtaining training data by using the obtained illumination information and an image obtained by capturing the at least one
(Continued)

spot, and training a neural network model for object recognition by using the training data.

20 Claims, 21 Drawing Sheets

(51) Int. Cl.

| | |
|---|---|
| ***G06V 10/26*** | (2022.01) |
| ***G06V 10/60*** | (2022.01) |
| ***G06V 10/74*** | (2022.01) |
| ***G06V 10/82*** | (2022.01) |
| ***G06V 20/50*** | (2022.01) |
| ***G06V 20/70*** | (2022.01) |

(52) U.S. Cl.
CPC .............. *G06V 10/74* (2022.01); *G06V 10/82* (2022.01); *G06V 20/50* (2022.01); *G06V 20/70* (2022.01)

(58) Field of Classification Search
CPC ...... G06V 20/70; G06V 10/25; G06V 10/454; G06V 10/764; G06V 10/776; G06V 20/56; G06T 11/206; G06T 3/40; G06T 7/11; A47L 9/28; G01J 1/02; G06N 3/08
See application file for complete search history.

(56) References Cited

U.S. PATENT DOCUMENTS

| | | | | |
|---|---|---|---|---|
| 11,030,767 | B2 | 6/2021 | Namiki | |
| 11,269,343 | B2 | 3/2022 | Park et al. | |
| 2015/0169082 | A1* | 6/2015 | Li | G06F 3/0304 345/157 |
| 2019/0243369 | A1 | 8/2019 | Wang | |
| 2019/0294954 | A1* | 9/2019 | Han | G06N 3/08 |
| 2019/0370691 | A1* | 12/2019 | Chae | G05D 1/6484 |
| 2020/0225673 | A1* | 7/2020 | Ebrahimi Afrouzi | G05D 1/0246 |
| 2022/0270296 | A1 | 8/2022 | He | |
| 2023/0104931 | A1 | 4/2023 | Choi et al. | |
| 2023/0205218 | A1 | 6/2023 | Byun et al. | |
| 2023/0363610 | A1* | 11/2023 | Zhang | A47L 11/4011 |

FOREIGN PATENT DOCUMENTS

| | | | |
|---|---|---|---|
| KR | 10-2018-0084305 | A | 7/2018 |
| KR | 10-2019-0010301 | A | 1/2019 |
| KR | 10-2017148 | B1 | 9/2019 |
| KR | 10-2119033 | B1 | 6/2020 |
| KR | 10-2021-0001578 | B1 | 1/2021 |
| KR | 10-2269053 | B1 | 6/2021 |
| KR | 10-2331563 | B1 | 11/2021 |
| KR | 10-2348963 | B1 | 1/2022 |
| KR | 10-2396048 | B1 | 5/2022 |
| WO | 2016/005011 | A1 | 1/2016 |

OTHER PUBLICATIONS

Yoo et al., Photorealistic Style Transfer via Wavelet Transforms, Sep. 29, 2019, Clova AI Research, NAVER Corp.
Dwibedi et al., Cut, Paste and Learn: Surprisingly Easy Synthesis for Instance Detection, Aug. 4, 2017, The Robotics Institute, Carnegie Mellon University.
Ikki et al., Object Recognition with Continual Open Set Domain Adaptation for Home Robot; 2021 IEEE Winter Conference on Applications of Computer Vision (WACV), 2021.
Extended European Search Report dated Sep. 10, 2025, issued in a European Application No. 23875231.5.

* cited by examiner

METHOD OF TRAINING OBJECT RECOGNITION MODEL BY USING SPATIAL INFORMATION AND COMPUTING DEVICE FOR PERFORMING THE METHOD

CROSS-REFERENCE TO RELATED APPLICATION(S)

This application is a continuation application, claiming priority under § 365(c), of an International application No. PCT/KR2023/015313, filed on Oct. 5, 2023, which is based on and claims the benefit of a Korean patent application number 10-2022-0129042, filed on Oct. 7, 2022, in the Korean Intellectual Property Office, and of a Korean patent application number 10-2022-0153955, filed on Nov. 16, 2022, in the Korean Intellectual Property Office, the disclosure of each of which is incorporated by reference herein in its entirety.

TECHNICAL FIELD

The disclosure relates to a method of training a neural network model for object recognition by using spatial information about a specific space and a computing device for performing the method.

BACKGROUND ART

Today, neural network models for object recognition are widely used in even electronic devices that are commonly found around. For example, electronic devices performing operations by moving within a specific space (e.g., a house), such as a robot vacuum cleaner, may recognize surrounding objects by using a neural network model and perform operations according to results of the recognition.

However, because lights are turned off, when a space in which an object is placed is entirely dark, or because only a specific area of the space is very bright compared to other areas, when an illumination difference is significant, there is a problem in that the object recognition accuracy of a neural network model is lowered.

For example, with regard to a robot vacuum cleaner, when the robot vacuum cleaner generally generates a map by performing spatial modeling on the inside of a house, lights are turned on and the house is entirely bright. However, when the robot vacuum cleaner actually performs an operation (cleaning), because the lights in the house are turned off, the house is entirely dark, and an illumination difference between areas is significant because light enters only a specific area (e.g., the window), and accordingly, there is a high possibility of misrecognition of objects.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Solution to Problem

Aspects of the disclosure are to address at least the above-mentioned problems and/or disadvantages and to provide at least the advantages described below. Accordingly, an aspect of the disclosure is to provide a method of training a neural network model for object recognition by using spatial information about a specific space and a computing device for performing the method.

Additional aspects will be set forth in part in the description which follows and, in part, will be apparent from the description, or may be learned by practice of the presented embodiments.

In accordance with an aspect of the disclosure, a method of training an object recognition model by using spatial information is provided. The method includes obtaining the spatial information including illumination information corresponding to a plurality of spots in a space, obtaining illumination information corresponding to at least one spot of the plurality of spots from the spatial information, obtaining training data by using the obtained illumination information and an image obtained by capturing the at least one spot, and training a neural network model for object recognition by using the training data.

In accordance with an aspect of the disclosure, a computing device for performing a method of training an object recognition model by using spatial information is provided. The computing device includes a memory storing a program for training a neural network model, and at least one processor configured to execute the program to obtain spatial information including illumination information corresponding to a plurality of spots in a space, obtain illumination information corresponding to at least one spot of the plurality of spots from the spatial information, obtain training data by using the obtained illumination information and an image obtained by capturing the at least one spot, and train the neural network model for object recognition by using the training data.

According to an embodiment of the disclosure, one or more computer-readable storage media storing computer-executable instructions that, when executed by at least one processor of an electronic device, configure the electronic device to perform operations including obtaining spatial information including illumination information corresponding to a plurality of spots in a space, obtaining illumination information corresponding to at least one of the plurality of spots from the spatial information, obtaining training data by using the obtained illumination information and an image obtained by capturing at least one spot of the plurality of spots, and training a neural network model for object recognition by using the training data.

According to an embodiment of the disclosure, a computer program is stored in a computer-readable recording medium so as to perform at least one of embodiments of the method, on a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

Figure 1:
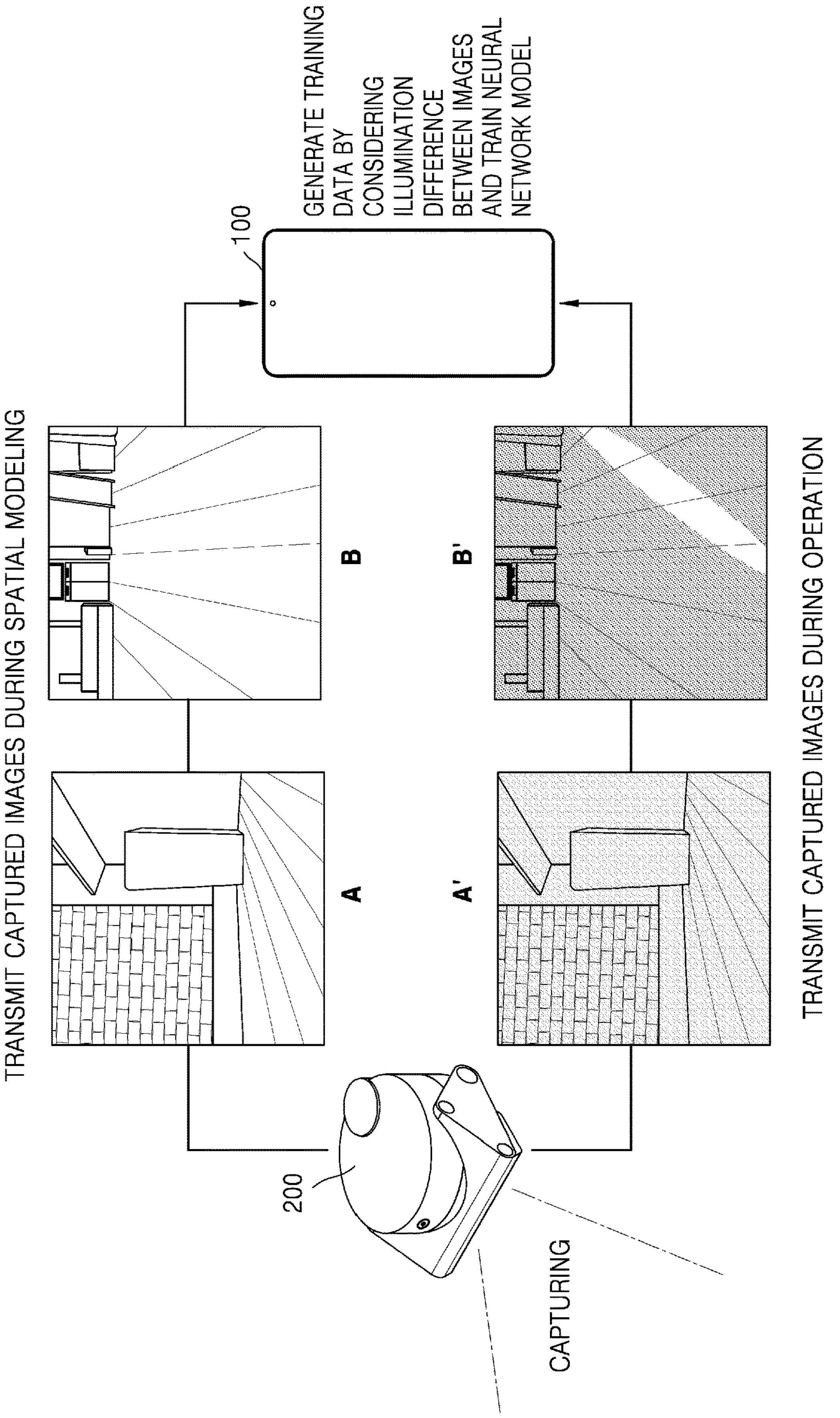
FIG. 1 is a diagram illustrating an environment for training a neural network model for object recognition by using spatial information according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

In the following description of the disclosure, descriptions of techniques that are well known in the art and not directly related to the disclosure are omitted. This is to clearly convey the gist of the disclosure by omitting an unnecessary description. The terms used herein are those defined based on functions in the disclosure, and may vary according to the intention of users or operators, precedents, or the like. Hence, the terms used herein should be defined based on the meaning of the terms together with the descriptions throughout the specification.

For the same reason, some elements in the accompanying drawings are exaggerated, omitted, or schematically illustrated. In addition, the size of each element may not substantially reflect its actual size. In each drawing, the same or corresponding element is denoted by the same reference numeral.

The advantages and features of the disclosure, and methods of achieving the same, will become apparent with reference to embodiments of the disclosure described below in conjunction with the accompanying drawings. The disclosure may, however, be embodied in many different forms and should not be construed as limited to embodiments of the disclosure set forth herein. These embodiments of the disclosure are provided so that this disclosure will be thorough and complete, and will fully convey the scope of the disclosure to one of ordinary skill in the art. An embodiment of the disclosure may be defined according to the claims. In the specification, the same reference numerals denote the same elements. While describing the disclosure, detailed descriptions of related well-known functions or configurations that may blur the gist of the disclosure are omitted. The terms used herein are those defined based on functions in the disclosure, and may vary according to the intention of users or operators, precedents, or the like. Hence, the terms used herein should be defined based on the meaning of the terms together with the descriptions throughout the specification.

It will be understood that each block of flowchart illustrations and combinations of blocks in the flowchart illustrations may be implemented by computer program instructions. These computer program instructions may be loaded into a processor of a general-purpose computer, special purpose computer, or other programmable data processing apparatus, and the instructions, which are executed via the processor of the computer or other programmable data processing apparatus may generate means for implementing the functions specified in the flowchart block(s). These computer program instructions may also be stored in a computer usable or computer-readable memory that may direct a computer or other programmable data processing apparatus to function in a particular manner, and the instructions stored in the computer usable or computer-readable memory may produce an article of manufacture including instruction means that implement the functions specified in the flowchart block(s). The computer program instructions may also be mounted on a computer or other programmable data processing apparatus.

In addition, each block of the flowchart illustrations may represent a module, segment, or portion of code, which includes one or more executable instructions for implementing the specified logical function(s). It should also be noted that in an embodiment of the disclosure, the functions noted in the blocks may occur out of the order shown. For example, two blocks shown in succession may in fact be executed substantially concurrently or the blocks may sometimes be executed in the reverse order, depending upon the functionality involved.

The term " . . . unit" used in the embodiment of the disclosure refers to a software or hardware component, such as a field-programmable gate array (FPGA) or an application-specific integrated circuit (ASIC), which performs certain tasks. However, the " . . . unit" does not mean to be limited to software or hardware. The " . . . unit" may be configured to be in an addressable storage medium or may be configured to operate one or more processors. In an embodiment of the disclosure, the " . . . unit" may include components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and " . . . units" may be combined into fewer components and " . . . units" or further separated into additional components and " . . . units". In addition, the " . . . unit" in an embodiment of the disclosure may include one or more processors.

Embodiments of the disclosure relate to a method of training a neural network model capable of increasing an object recognition accuracy by using spatial information. Before specific embodiments of the disclosure are described, the meaning of terms frequently used in this specification is defined.

In the disclosure, 'spatial information' may include various types of information related to the characteristics of a space. According to an embodiment of the disclosure, the spatial information may include images obtained by capturing a plurality of spots included in a specific space. In addition, the spatial information may include images generated based on information obtained at the plurality of spots included in the specific space. The information obtained at the plurality of spots may be a captured image obtained through a camera, or may be sensor data obtained through another sensor, such as a lidar, or the like. In addition, the information obtained from the plurality of spots may be information obtained by combining a plurality of sensor data obtained through a plurality of sensors. In addition, according to an embodiment of the disclosure, the spatial information may include a map of the specific space. The map may include information, such as a structure of a space, a relationship between areas included in the space, locations of objects located in the space, or the like.

In the disclosure, 'illumination information' may include various types of information related to brightness of a plurality of spots included in a space. According to an embodiment of the disclosure, images obtained by capturing the plurality of spots included in the specific space may include the illumination information. Each captured image may indicate a brightness level (how bright a captured spot is) at a time when capturing is performed. In addition, each captured image may further include metadata corresponding to the illumination information. According to an embodiment of the disclosure, the map of the specific space may also include the illumination information. For example, information, such as average illumination, about each of a plurality of areas included in the map may be recorded. A specific method of configuring the map to include the illumination information is described below.

A 'robotic mobile device' may refer to any type of device that performs various operations by moving automatically or according to a user's command. The robotic mobile device described in the disclosure may capture a surrounding environment to perform an operation, recognize an object included in a captured image, and perform the operation based on an object recognition result. Therefore, a neural network model for object recognition may be mounted on the robotic mobile device. A representative example of the robotic mobile device is a robot vacuum cleaner and it is assumed in the disclosure that the robotic mobile device is the robot vacuum cleaner, but a method of training a neural network model according to embodiments described in the disclosure and the trained neural network model are not limited thereto and may be used in various types of robotic mobile devices. In addition, the method of training the neural network model according to embodiments described in the disclosure and the trained neural network model may be used by any type of device that needs to perform object recognition, not the robotic mobile device.

A 'style transfer' means an operation of transferring a style of a specific image to another image. In this regard, a 'style' may include the color, tone, and brightness of the image. An image including the transferred style is referred to as a 'style image', and an image to which the style is transferred is defined as a 'content image'. An output image may be generated by performing the style transfer, and transferring the style included in the style image to the content image. In other words, when the style transfer is performed by using the content image and the style image as inputs, an image (output image) in which the style of the style image is transferred to the content image may be output.

Hereinafter, a method of training an object recognition model by using spatial information and a computing device for performing the method according to embodiments of the disclosure are described with reference to drawings.

FIG. 1 is a diagram illustrating an environment for training a neural network model for object recognition by using spatial information according to an embodiment of the disclosure.

Referring to FIG. 1, a robot vacuum cleaner 200 may obtain the spatial information by moving in a specific space, and transmit the spatial information to a mobile terminal 100, and the mobile terminal 100 may train the neural network model by using the received spatial information and then transmit the trained neural network model to the robot vacuum cleaner 200. At this time, the spatial information obtained by the robot vacuum cleaner 200 may include illumination information about a plurality of spots in the space, and the mobile terminal 100 may use the spatial information and the Illumination information included therein when training the neural network model. In addition, according to an embodiment of the disclosure, the robot vacuum cleaner 200 may train the neural network model by itself without transmitting the spatial information to the mobile terminal 100.

According to an embodiment of the disclosure, it is assumed that when the robot vacuum cleaner 200 transmits captured images to the mobile terminal 100, the mobile terminal 100 generates training data by considering an illumination difference between the received images and performs training on the neural network model by using the generated training data.

The reason why the mobile terminal 100, not the robot vacuum cleaner 200, performs training on the neural network model in the embodiment of the disclosure in FIG. 1 is that the mobile terminal 100 generally includes a higher performance processor than the robot vacuum cleaner 200. According to the embodiment of the disclosure, the robot vacuum cleaner 200 may directly perform training on the neural network model, or a higher-performance computing device (e.g., a laptop, a desktop, a server, or the like) may perform training on the neural network model, instead of the mobile terminal 100. For example, operations described as being performed by the mobile terminal 100 in the embodiments of the disclosure may be performed by various computing devices capable of communication and operation.

According to an embodiment of the disclosure, a home Internet of things (IoT) server that controls IoT devices, such as the robot vacuum cleaner 200, is present in the home, and the home IoT server may perform the operations described above as being performed by the mobile terminal 100 instead.

In addition, according to an embodiment of the disclosure, operations described as being performed by the robot vacuum cleaner 200 in the disclosure, such as obtaining the spatial information by moving in the specific space, transmitting the obtained spatial information to the mobile terminal 100, and recognizing an object in the space may also be performed by another electronic device (e.g., a butler robot, a pet robot, or the like), instead of the robot vacuum cleaner 200.

According to an embodiment of the disclosure, a firstly trained neural network model may be already mounted on the robot vacuum cleaner 200, and the mobile terminal 100 may update the neural network model mounted on the robot vacuum cleaner 200 by performing additional training on the neural network model by using the received images, and then transmitting the neural network model to the robot vacuum cleaner 200. A subject training the neural network model may be flexibly determined according to the performance of each device included in a system and available resources.

In addition, according to an embodiment of the disclosure, while a trained neural network model is not mounted in the robot vacuum cleaner 200, a new neural network model may be trained and mounted on the robot vacuum cleaner 200 according to embodiments described in the disclosure. In this regard, training on the new neural network model may also be performed by any one of the mobile terminal 100, the robot vacuum cleaner 200, or another computing device.

According to an embodiment of the disclosure, the robot vacuum cleaner 200 may obtain spatial information including illumination information corresponding to a plurality of spots in a space and transmit the spatial information to the mobile terminal 100. Specifically, the robot vacuum cleaner 200 may obtain the spatial information by capturing the plurality of spots in the space during spatial modeling and by capturing the plurality of spots in the space during an operation (cleaning). At this time, images obtained by capturing the plurality of spots correspond to the spatial information.

In addition, according to an embodiment of the disclosure, the robot vacuum cleaner 200 may generate a map of the space by using captured images during spatial modeling. At this time, the generated map also corresponds to the spatial information.

According to an embodiment of the disclosure, the images obtained by capturing the plurality of spots by the robot vacuum cleaner 200 may include illumination information of the captured spots. The brightness of a spot to be captured is expressed in an image, and may correspond to illumination information of the spot. Accordingly, the robot vacuum cleaner 200 or the mobile terminal 100 may obtain the illumination information corresponding to the plurality of spots from the captured images.

In addition, as will be described below, according to an embodiment of the disclosure, an image pair may be obtained by matching two images obtained by capturing the same spot at different time zones (e.g., during spatial modeling and during an operation), and an illumination difference may be obtained between the two images included in the image pair. In this regard, the illumination difference also corresponds to the illumination information.

Referring to FIG. 1, the robot vacuum cleaner 200 may transmit images A and B captured during spatial modeling and images A' and B' captured during an operation (cleaning) to the mobile terminal 100. The robot vacuum cleaner 200 may first perform modeling of a space (e.g., a house) in which the robot vacuum cleaner 200 is used before performing the operation. For example, when a user purchases the robot vacuum cleaner 200 and drives the robot vacuum cleaner 200 in the house for the first time, the robot vacuum cleaner 200 may perform capturing by moving around the house and analyze (e.g., object recognition, semantic segmentation, or the like) captured images, thereby generating a map of the house (the space). The generated map is described with reference to FIGS. 4A and 4B below.

According to an embodiment of the disclosure, the robot vacuum cleaner 200 may transmit the images A and B captured at regular intervals (e.g., time or distance) to the mobile terminal 100 in a process of performing modeling of the space. The robot vacuum cleaner 200 may record at least one of a location where capturing is performed or a spot to be captured in a path map during spatial modeling, and perform capturing based on the path map during a subsequent operation, thereby obtaining captured images of the same spots at different two time zones.

When modeling of the space is completed, the robot vacuum cleaner 200 may perform a cleaning operation. According to an embodiment of the disclosure, the robot vacuum cleaner 200 may transmit the captured images A' and B' to the mobile terminal 100 during the operation. The robot vacuum cleaner 200 may perform capturing at the location recorded on the path map generated during spatial modeling (the location where images transmitted to the mobile terminal 100 during spatial modeling are captured), and transmit the captured images A' and B' to the mobile terminal 100.

As described above, the robot vacuum cleaner 200 may perform capturing of the same spots during spatial modeling and during the operation by using the generated map (spatial information), and transmit captured images to the mobile terminal 100. The reason for training the neural network model by using the captured images of the same spots during spatial modeling and the operation is as follows.

In general, a situation in which the robot vacuum cleaner 200 performs spatial modeling is highly likely to be a state where a user stays at home, that is, a state where lights are turned on even during the day or night. However, a situation in which the robot vacuum cleaner 200 performs the cleaning operation is highly likely to be a state where the house is dark when the lights are turned off. Therefore, because an illumination difference between images collected by the robot vacuum cleaner 200 during spatial modeling and images captured during an actual operation is large, there is a high possibility that the robot vacuum cleaner 200 may not accurately recognize an object (e.g., clothes, wires, or the like) located in the front during the operation. In the embodiments of the disclosure, in order to address this issue, training data is generated by considering the illumination difference between images captured during spatial modeling and images captured the during operation, and is used to train the neural network model for object recognition.

In the embodiments of the disclosure, the images A and B captured by the robot vacuum cleaner 200 during spatial modeling are referred to as content images, and the images A' and B' captured by the robot vacuum cleaner 200 during the operation are referred to as style images. According to an embodiment of the disclosure, a content image and a style image obtained by capturing the same spot may be matched as an image pair. According to an embodiment of the disclosure, the mobile terminal 100 may generate training data by performing style transfer by using the content images A and B and the style images A' and B', which is described again below.

Referring to FIG. 1 and the following drawings, only the two content images A and B and the two style images A' and B' are shown for convenience of description, but it is obvious that a greater number of content images and style images they may be used.

Figure 2:
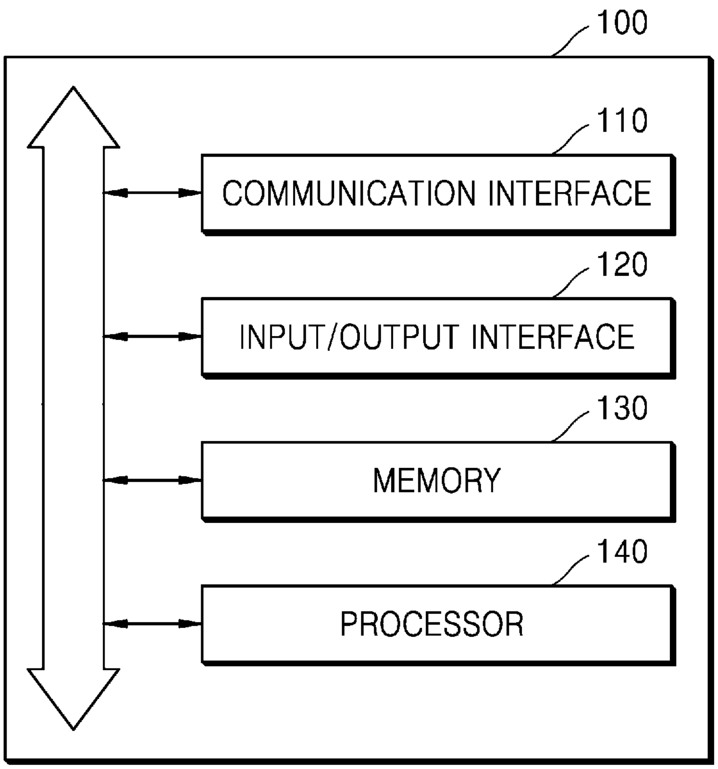
FIG. 2 is a diagram illustrating a detailed configuration of a mobile terminal according to an embodiment of the disclosure.

FIG. 2 is a diagram illustrating a detailed configuration of the mobile terminal according to an embodiment of the disclosure.

Referring to FIG. 2, the mobile terminal 100 according to an embodiment of the disclosure may include a communication interface 110, an input/output interface 120, a memory 130 and a processor 140. However, the components of the mobile terminal 100 are not limited to the above-described examples, and the mobile terminal 100 may include more or fewer components than the above-described components. In an embodiment of the disclosure, some or all of the communication interface 110, the input/output interface 120, the memory 130, and the processor 140 may be implemented in the form of a single chip, and the processor 140 may include one or more processors.

The communication interface 110 is a component transmitting and receiving signals (control commands and data, or the like) with an external device by wired or wirelessly, and may be configured to include a communication chipset supporting various communication protocols. The communication interface 110 may receive a signal from the outside and output the signal to the processor 140 or transmit the signal output from the processor 140 to the outside.

The input/output interface 120 may include an input interface (e.g., a touch screen, a hard button, a microphone, or the like) receiving control commands or information from a user, and an output interface (e.g., a display panel, a speaker, or the like) displaying an execution result of an operation under the control by the user or a state of the mobile terminal 100.

The memory 130 is a component storing various programs or data, and may include a storage medium, such as a read-only memory (ROM), a random access memory (RAM), a hard disk, a compact disc read-only memory (CD-ROM), and a digital video disc (DVD), or a combination of storage media. The memory 130 may not exist separately and may be included in the processor 140. The memory 130 may include volatile memory, non-volatile memory, or a combination of volatile memory and non-volatile memory. The memory 130 may store a program for performing operations according to embodiments of the disclosure described below. The memory 130 may provide the stored data to the processor 140 according to a request of the processor 140.

The processor 140 is a component controlling a series of processes so that the mobile terminal 100 operates according to embodiments of the disclosure described below, and may include one or a plurality of processors. In this regard, the one or the plurality of processors may be general-purpose processors such as a central processing unit (CPU), an application processor (AP), or a digital signal processor (DSP), a graphics dedicated processor, such as a graphics processing unit (GPU) or a vision processing unit (VPU), or artificial intelligence dedicated processors such as an numeric processing unit (NPU). For example, when the one or the plurality of processors are the artificial intelligence dedicated processors, the artificial intelligence dedicated processors may be designed in a hardware structure specialized for processing a specific artificial intelligence model.

The processor 140 may record data to the memory 130 or read data stored in the memory 130, and in particular, execute a program stored in the memory 130 to process the data according to a predefined operation rule or an artificial intelligence model. Accordingly, the processor 140 may perform operations described in the following embodiments of the disclosure, and operations described to be performed by the mobile terminal 100 in the following embodiments of the disclosure may be performed by the processor 140 unless otherwise specified.

Figure 3:
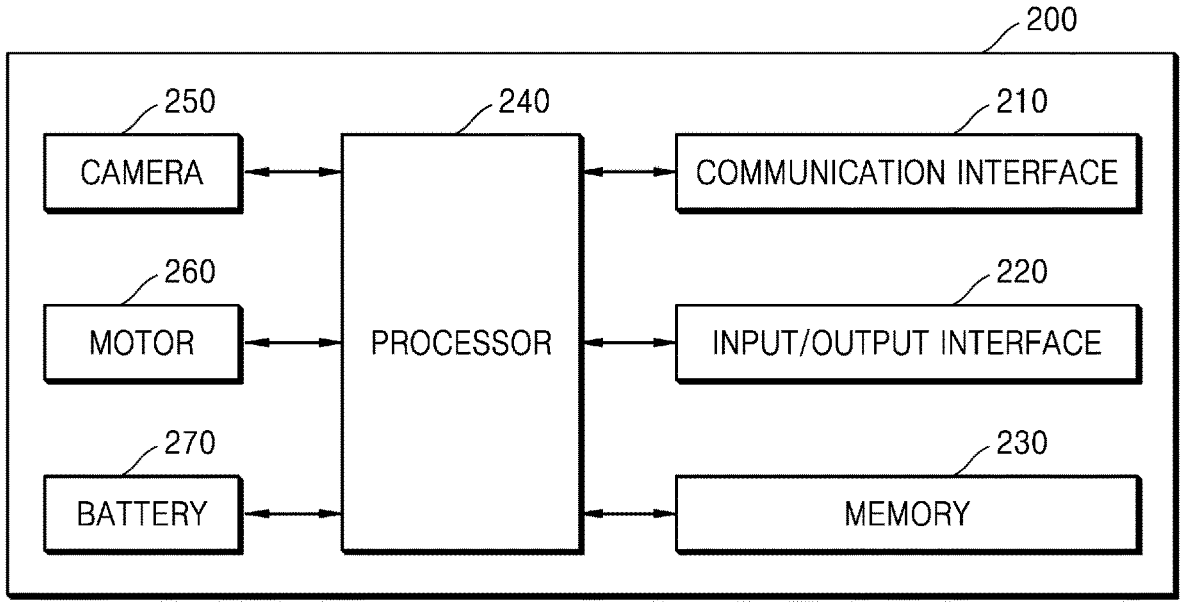
FIG. 3 is a diagram illustrating a detailed configuration of a robot vacuum cleaner according to an embodiment of the disclosure.

FIG. 3 is a diagram illustrating a configuration of a robot vacuum cleaner according to an embodiment of the disclosure.

Referring to FIG. 3, a robot vacuum cleaner 200 according to an embodiment of the disclosure may include a communication interface 210, an input/output interface 220, a memory 230, a processor 240, a camera 250, a motor 260, and a battery 270. However, the components of the robot vacuum cleaner 200 are not limited to the above-described examples, and the robot vacuum cleaner 200 may include more or fewer components than the above-described components. In an embodiment of the disclosure, some or all of the communication interface 210, the input/output interface 220, the memory 230, and the processor 240 may be implemented in a single chip form, and the processor 240 may include one or more processors.

The communication interface 210 is a component transmitting and receiving signals (control commands and data, or the like) with an external device by wired or wirelessly, and may be configured to include a communication chipset supporting various communication protocols. The communication interface 210 may receive a signal from the outside and output the signal to the processor 240 or transmit the signal output from the processor 240 to the outside. According to an embodiment of the disclosure, the robot vacuum cleaner 200 may transmit images captured through the camera 250 to be described below to the mobile terminal 100 through the communication interface 210.

The input/output interface 220 may include an input interface (e.g., a touch screen, a hard button, a microphone, or the like) receiving control commands or information from a user, and an output interface (e.g., a display panel, a speaker, or the like) displaying an execution result of an operation under the control by the user or a state of the robot vacuum cleaner 200.

The memory 230 is a component storing various programs or data, and may include a storage medium, such as a ROM, a RAM, a hard disk, a CD-ROM, and a DVD, or a combination of storage media. The memory 230 may not exist separately and may be included in the processor 240. The memory 230 may include a volatile memory, a non-volatile memory, or a combination of the volatile memory and the non-volatile memory. The memory 230 may store a program for performing operations according to embodiments of the disclosure described below. The memory 230 may provide stored data to the processor 240 according to a request of the processor 240.

The processor 240 is a component that controls a series of processes so that the robot vacuum cleaner 200 operates according to embodiments of the disclosure described below, and may include one or a plurality of processors. In this regard, the one or the plurality of processors may be general-purpose processors, such as a CPU, an AP, or a DSP, a graphics dedicated processor, such as a GPU or a VPU, or artificial intelligence dedicated processors, such as an NPU. For example, when the one or the plurality of processors are the artificial intelligence dedicated processors, the artificial intelligence dedicated processors may be designed in a hardware structure specialized for processing a specific artificial intelligence model.

The processor 240 may record data to the memory 230 or read data stored in the memory 230, and in particular, execute a program stored in the memory 230 to process the data according to a predefined operation rule or an artificial intelligence model. Accordingly, the processor 240 may perform operations described in the following embodiments of the disclosure, and operations described to be performed by the robot vacuum cleaner 200 in the following embodiments of the disclosure may be performed by the processor 240 unless otherwise specified.

The camera 250 is a component capturing surroundings of the robot vacuum cleaner 200. The robot vacuum cleaner 200 may obtain spatial information from images captured by using the camera 250. According to an embodiment of the disclosure, the robot vacuum cleaner 200 may obtain images of a plurality of spots in a space by capturing the front by using the camera 250 with respect to a moving direction. The processor 240 may generate a map of the space by performing spatial modeling by using the obtained images. In addition, the robot vacuum cleaner 200 may transmit the obtained images to the mobile terminal 100 during an operation.

The motor 260 is a component providing power necessary for the robot vacuum cleaner 200 to perform a cleaning operation. According to an embodiment of the disclosure, the robot vacuum cleaner 200 may move in the space due to a driving force provided by the motor 260 and perform the cleaning operation (e.g., suction).

The battery 270 may provide power to the components included in the robot vacuum cleaner 200.

Hereinafter, embodiments of the disclosure in which the robot vacuum cleaner 200 and the mobile terminal 100 train a neural network model for object recognition by using spatial information are described below.

First, a method, performed by the robot vacuum cleaner 200, of generating a map of a space through spatial modeling is described.

Figure 4A:
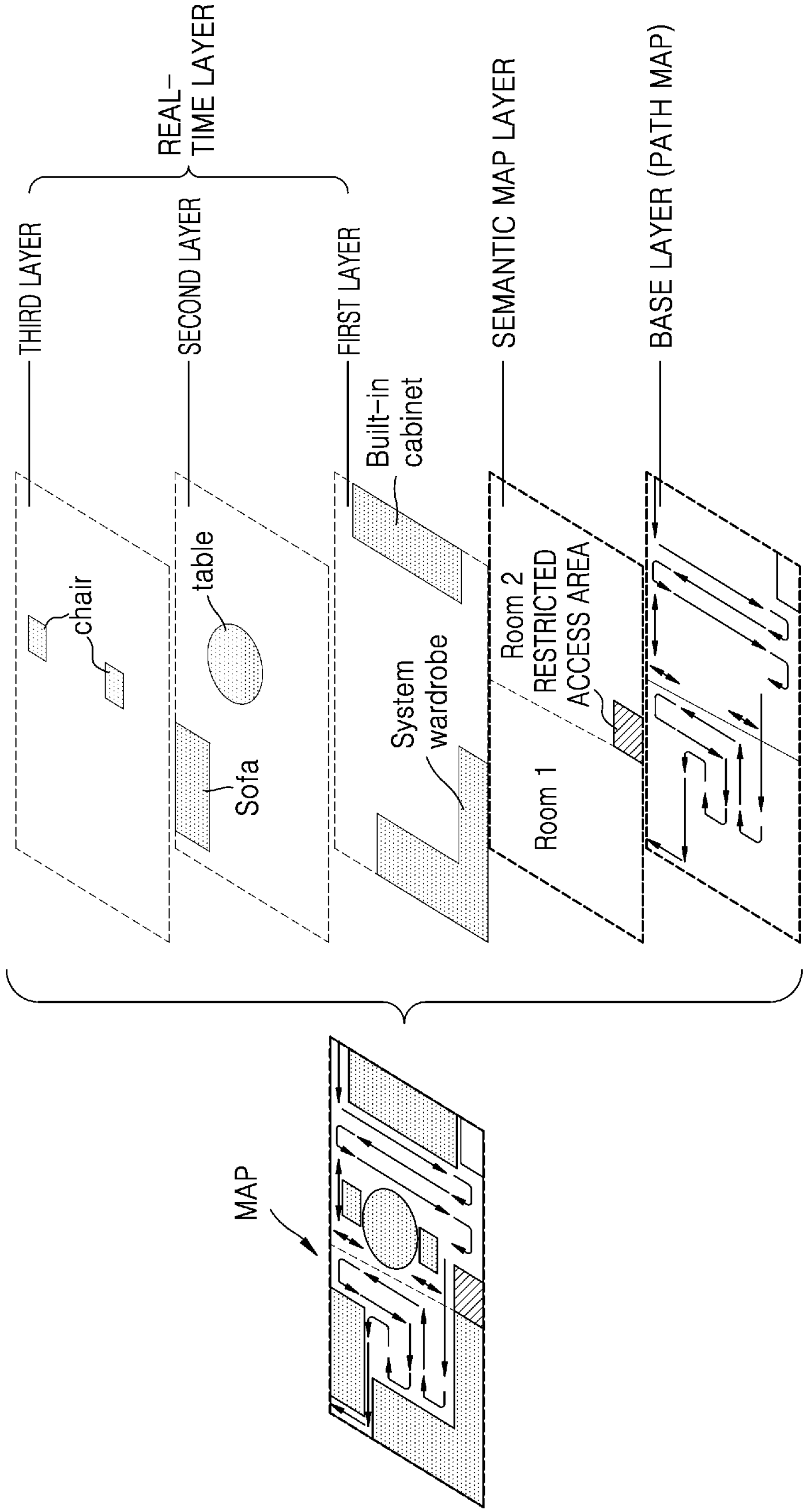
FIGS. 4A and 4B are diagrams illustrating maps generated by a robot vacuum cleaner according to various embodiments of the disclosure.
Figure 4B:
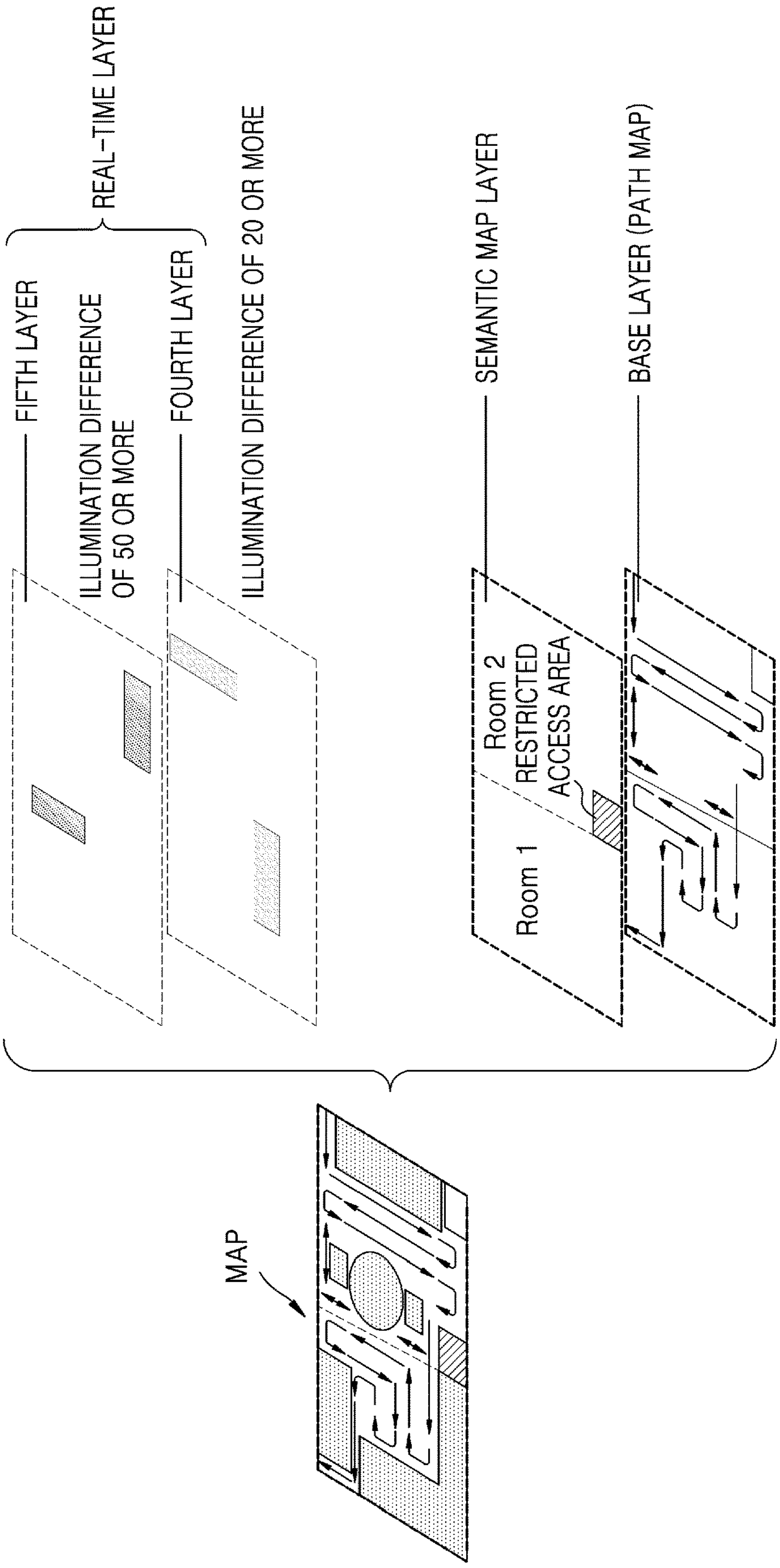

FIGS. 4A and 4B are diagrams illustrating maps generated by a robot vacuum cleaner according to various embodiments of the disclosure.

Referring to FIG. 4A, the generated map according to an embodiment of the disclosure may include a plurality of layers.

A base layer may include information about the overall structure of a space. The base layer may also include information about a path traveled by the robot vacuum cleaner 200 during spatial modeling, and accordingly, the base layer may correspond to the path map described above. A location where capturing is performed during spatial modeling may be recorded in the path map, which is described with reference to FIG. 5 below.

A semantic map layer may include information about a plurality of areas in which the space is conceptually divided. In the embodiment of the disclosure shown in FIG. 4A, the space is divided into two rooms (room 1 and room 2), and the semantic map layer includes information about areas divided into different rooms.

First to third layers correspond to real-time layers, and accordingly, information included in these layers may be changed according to an environment change in the space, and in some cases, some layers may be deleted or a new layer may be added.

Referring to FIG. 4A, locations of objects (such as furniture, or the like) located in the space are displayed on all of the first to third layers, objects with a lowest possibility of movement are displayed on the first layer, and objects with a highest possibility of movement are displayed on the third layer. According to an embodiment of the disclosure, the objects displayed on the first layer to the third layer may all be displayed on one layer, and the configuration of a layer may be configured in various ways according to the purpose of a task to be performed through the map.

According to an embodiment of the disclosure, the robot vacuum cleaner 200 may determine the locations of the objects located in the space through the map and may set a movement path during the operation. In addition, when an object is moved, added, or deleted in the space, the robot vacuum cleaner 200 may update a layer including the object.

As described above, the robot vacuum cleaner 200 may update the map according to the task to be performed, and according to an embodiment of the disclosure, illumination information may be stored in the map for training of a neural network model.

Referring to FIG. 4B, the robot vacuum cleaner 200 may store illumination information in a fourth layer and a fifth layer, which are real-time layers. The fourth layer and the fifth layer may be added while the first to third layers of FIG. 4A are maintained, or at least one of the first to third layers may be deleted and the fourth layer and the fifth layer may be added. As such, changes, additions, or deletions of layers included in the map may be performed as needed.

Referring to FIG. 4B, the fourth layer and the fifth layer display areas where an illumination difference between two different time zones (e.g., during spatial modeling and during an operation) is included in a certain range. The fourth layer displays areas with an illumination difference of 20 or more, and the fifth layer displays areas with an illumination difference of 50 or more. A method of obtaining the illumination difference between two different time zones is described with reference to FIG. 6 below.

According to an embodiment of the disclosure, the illumination information stored in the fourth layer and the fifth layer may be used when training data is generated. According to an embodiment of the disclosure, when the mobile terminal 100 generates the training data, the robot vacuum cleaner 200 may transmit the map to the mobile terminal 100, or transmit only some layers included in the map or illumination information included in the map to the mobile terminal 100, then the mobile terminal 100 may generate the training data by using the map, the layers included in the map, or the illumination information included in the map.

For example, when an image (a content image) for generating the training data is an image obtained by capturing a spot in an area (an area with an illumination difference of 20 or more) displayed on the fourth layer, the mobile terminal 100 may change a style of the content image by performing a style transfer on the content image according to a first set value. In this case, the first set value may be determined according to illumination information (an illumination difference of 20 or more) corresponding to the area displayed on the fourth layer. In summary, the mobile terminal 100 may obtain illumination information corresponding to an area including a spot where the content image is captured from the map (the fourth layer and the fifth layer), and change the style of the content image by using the obtained illumination information, thereby generating the training data.

A process in which the mobile terminal 100 generates training data by using the content images A and B and the style images A' and B' received from the robot vacuum cleaner 200 and trains a neural network model is described below.

Figure 5:
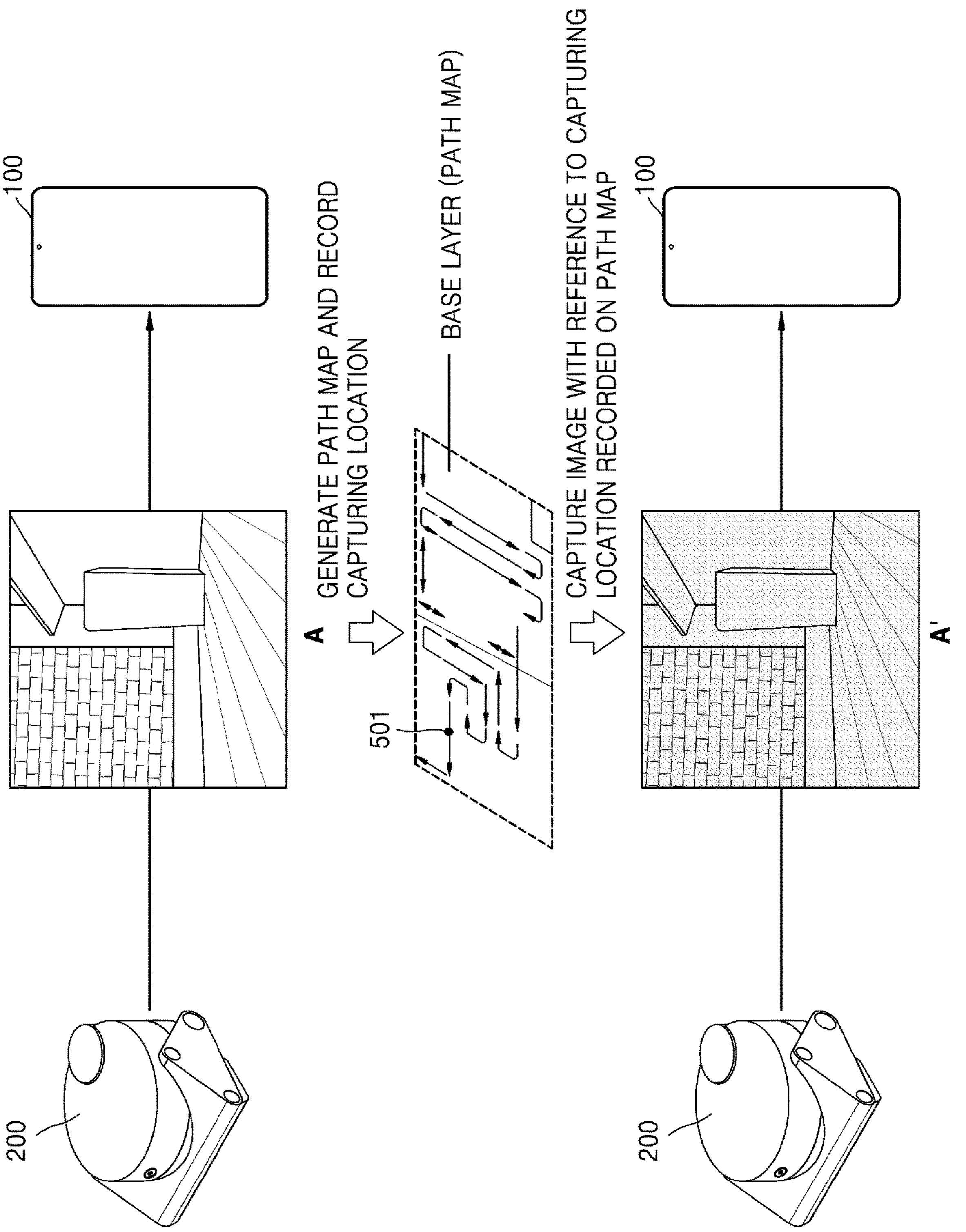
FIG. 5 is a diagram illustrating a method, performed by a robot vacuum cleaner, of transmitting a content image and a style image captured at a same spot, to a mobile terminal, according to an embodiment of the disclosure.

FIG. 5 is a diagram illustrating a method, performed by a robot vacuum cleaner, of transmitting a content image and a style image captured at a same spot, to a mobile terminal according to an embodiment of the disclosure.

Referring to FIG. 5, the robot vacuum cleaner 200 may record a location 501 where the content image A is captured on a path map while transmitting the content image A captured during spatial modeling to the mobile terminal 100. The robot vacuum cleaner 200 may then perform capturing at the location 501 recorded on the path map while performing a cleaning operation, and transmit the captured style image A' to the mobile terminal 100.

As such, the robot vacuum cleaner 200 may record locations where the content images A and B were captured on the path map generated during spatial modeling, and capture the style images A' and B' at the same locations as the content images A and B with reference to the path map while performing the cleaning operation, and transmit the captured style images A' and B' to the mobile terminal 100.

When receiving the content images A and B and the style images A' and B' from the robot vacuum cleaner 200, the mobile terminal 100 may obtain a plurality of image pairs by matching images having corresponding positions with each other. For example, the mobile terminal 100 may match the content image A and the style image A' as one image pair, and match the content image B and the style image B' as another image pair.

Figure 6:
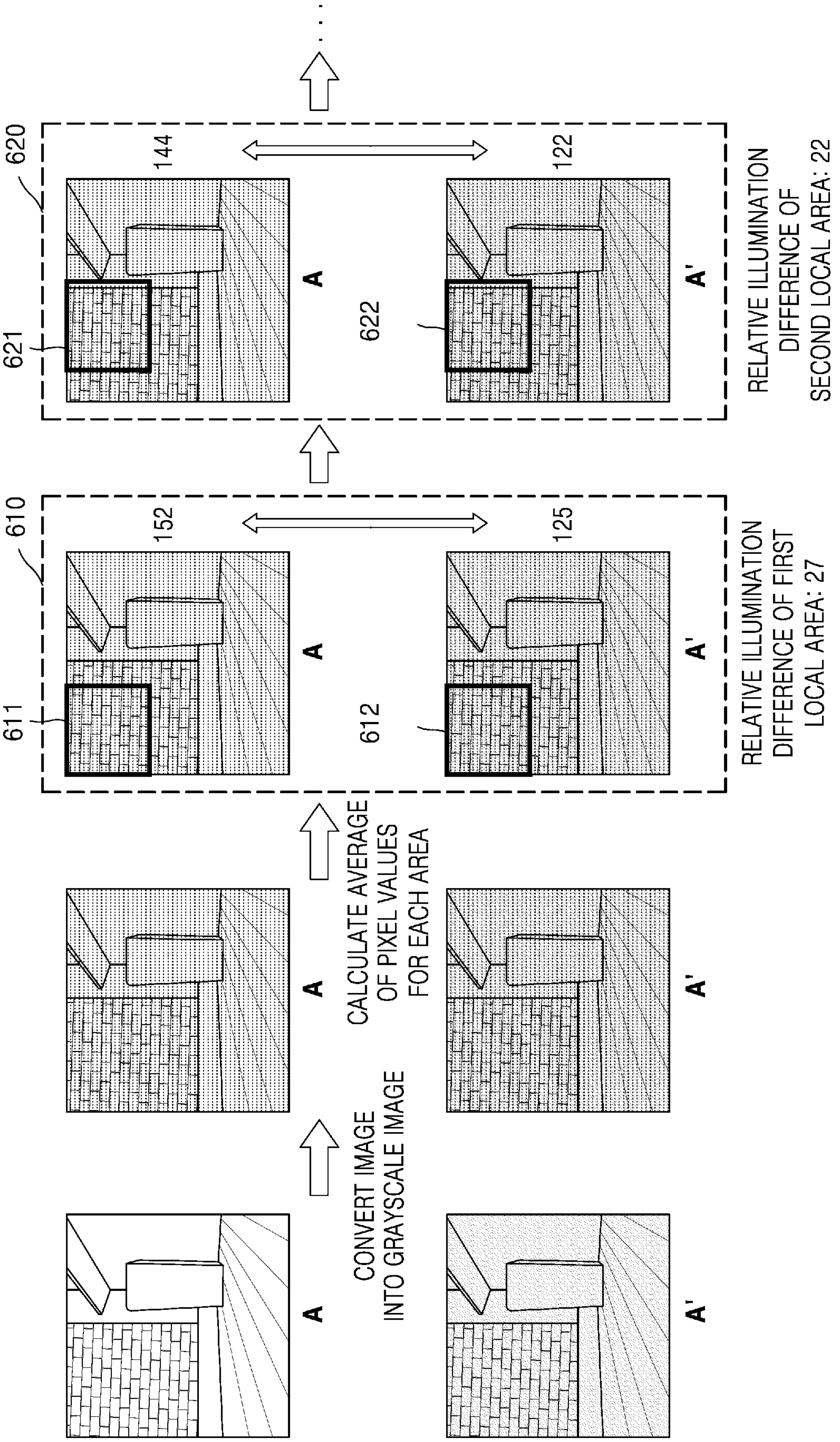
FIG. 6 is a diagram illustrating a method of obtaining an illumination difference between two images included in an image pair according to an embodiment of the disclosure.

FIG. 6 is a diagram illustrating a method of obtaining an illumination difference between two images included in an image pair according to an embodiment of the disclosure. Processes of the method shown in FIG. 6 may be performed by the mobile terminal 100.

As described above, according to an embodiment of the disclosure, a content image and a style image captured at the same location may be matched and processed as one image pair. FIG. 6 illustrates a process in which the mobile terminal 100 calculates the illumination difference between the content image A and the style image A' included in an image pair A and A'.

Referring to FIG. 6, the mobile terminal 100 may convert each of the content image A and the style image A' into a grayscale image, and then calculate an average value of pixels for each area within each image.

According to an embodiment of the disclosure, the mobile terminal 100 may divide the content image A and the style image A' into a plurality of areas (e.g., a first local area to an $N^{th}$ local area), and calculate an illumination difference between the content image A and the style image A' of each of the divided plurality of areas.

A process 610 in which the mobile terminal 100 calculates an illumination difference between first local areas 611 and 612 is described as follows. The mobile terminal 100 calculates an average 152 of values of pixels included in the first local area 611 of the content image A. Because the content image A is converted to the grayscale image, pixels included in the content image A may have values from 0 to 255. The same applies to the style image A'. Subsequently, the mobile terminal 100 calculates an average 125 of values of pixels included in the first local area 612 of the style image A'. The mobile terminal 100 calculates a difference 27 in the averages 152 and 125 of values of pixels between the content image A and the style image A' of the first local areas 611 and 612.

A process 620 in which the mobile terminal 100 calculates an illumination difference between second local areas 621 and 622 is described as follows. The mobile terminal 100 calculates an average 144 of values of pixels included in the second local area 621 of the content image A. Subsequently, the mobile terminal 100 calculates an average 122 of values of pixels included in the second local area 622 of the style image A', and calculates a difference 22 between the two averages 144 and 122.

A relative illumination difference of each local area is referred to as a ‘local illumination difference’. The relative illumination difference between the first local areas 611 and 612 becomes a first local illumination difference, and the relative illumination difference between the second local areas 621 and 622 becomes a second local illumination difference.

The mobile terminal 100 may calculates the relative illumination difference ($N^{th}$ local illumination difference) of the $N^{th}$ local area in the same manner, and then calculate an average of the first to $N^{th}$ local illumination difference, thereby obtaining a ‘global illumination difference’ of the image pair A and A'. In other words, a value obtained by averaging the first to $N^{th}$ local illumination differences of a specific image pair becomes the global illumination difference.

A plurality of local areas may be set not to overlap each other, but as shown in FIG. 6, some areas may be set to overlap each other.

Figure 7:
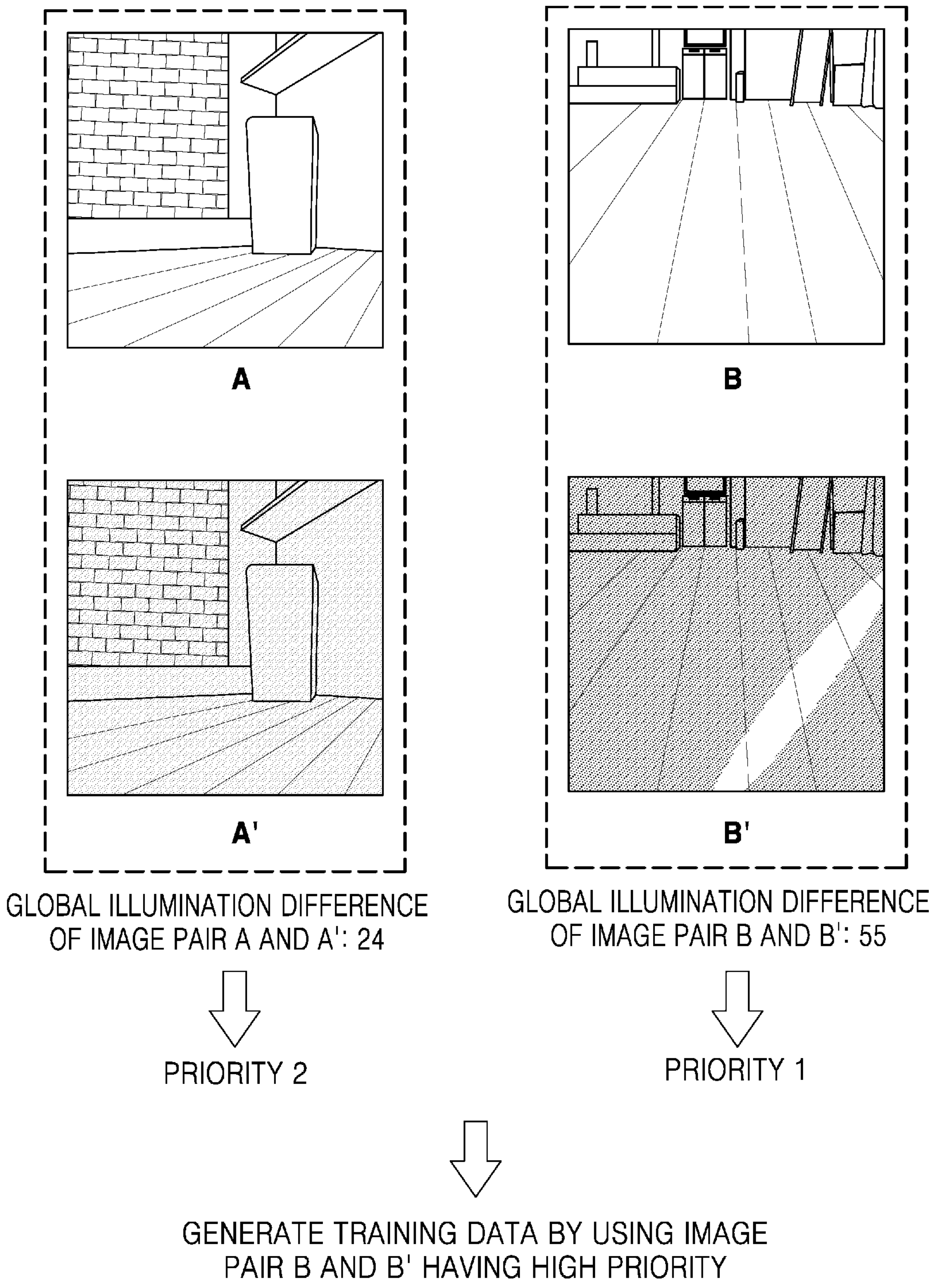
FIG. 7 is a diagram illustrating a method, performed by a mobile terminal, of giving priority to a plurality of image pairs and selecting an image pair to be used for generating training data according to a priority according to an embodiment of the disclosure.

FIG. 7 is a diagram illustrating a method, performed by a mobile terminal, of giving priority to a plurality of image pairs and selecting an image pair to be used for generating training data according to a priority according to an embodiment of the disclosure.

It is assumed that the mobile terminal 100 calculates a global illumination difference of each of image pairs A and A' and B and B' according to the method described above with reference to FIG. 6.

Referring to FIG. 7, it may be seen that the global illumination difference of the image pair A and A' calculated by the mobile terminal 100 is 24, and the global illumination difference of the image pair B and B' is 55.

According to an embodiment of the disclosure, the mobile terminal 100 may give priority to the plurality of image pairs based on the global illumination difference. In the embodiment of the disclosure shown in FIG. 7, because the global illumination difference 55 of the image pair B and B' is higher than the global illumination difference 24 of the image pair A and A', the mobile terminal 100 gives priority 1 to the image pair B and B' and priority 2 to the image pair A and A'.

According to an embodiment of the disclosure, the mobile terminal 100 may generate the training data by using a preset number of image pairs having a high priority among the plurality of image pairs. For example, in the embodiment of the disclosure shown in FIG. 7, assuming that the mobile terminal 100 generates the training data by using only one image pair having a higher priority among two image pairs, the mobile terminal 100 may generate the training data by using the image pair B and B'.

In the embodiment of the disclosure, for convenience of explanation, it is assumed that a total of two image pairs exist, and the mobile terminal 100 generates the training data by using one image pair having a higher priority among the two image pairs. However, differently from this, the mobile terminal 100 may generate the training data by using some image pairs having higher priority or image pairs having a higher percentage of priority among a large number of image pairs.

The mobile terminal 100 may synthesize an object with the content image B and perform a style transfer on the content image synthesized with the object (transfer a style of a style image) in order to generate the training data by using the selected image pair B and B'. In addition, according to an embodiment of the disclosure, when an object is already included in a content image to be used when generating the training data, the mobile terminal 100 may perform only the style transfer without synthesizing the object with the content image.

Hereinafter, a process of performing an object synthesis and the style transfer is described with reference to FIGS. 8 and 9, and a process of performing (additional) training on a neural network model by using the generated training data is described with reference to FIGS. 10A and 10B. In addition, a method of selecting an object to be synthesized with a content image is described with reference to FIG. 11, and a method of selecting an area of the content image to be synthesized with the object is described with reference to FIGS. 12A and 12B.

Figure 8:
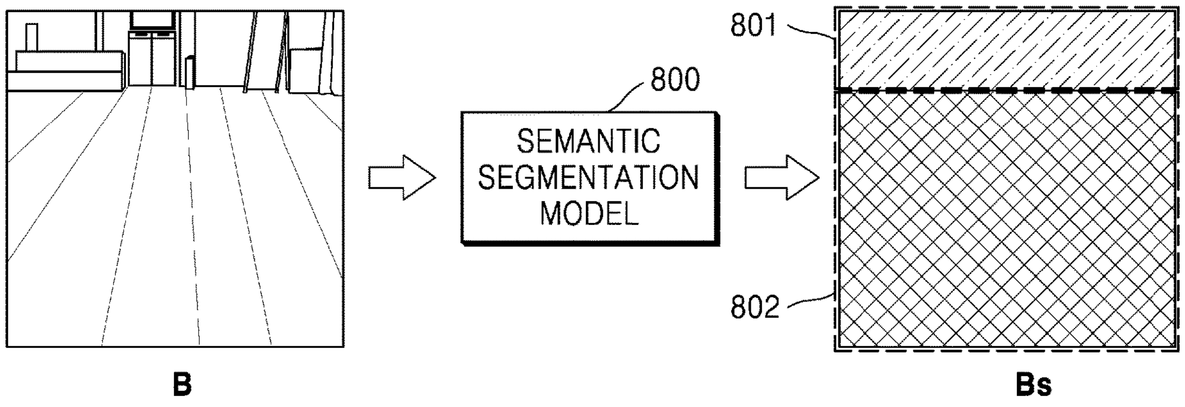
FIGS. 8 and 9 are diagrams illustrating a process of synthesizing an object with a content image and then performing a style transfer and generating training data according to various embodiments of the disclosure.
Figure 9:
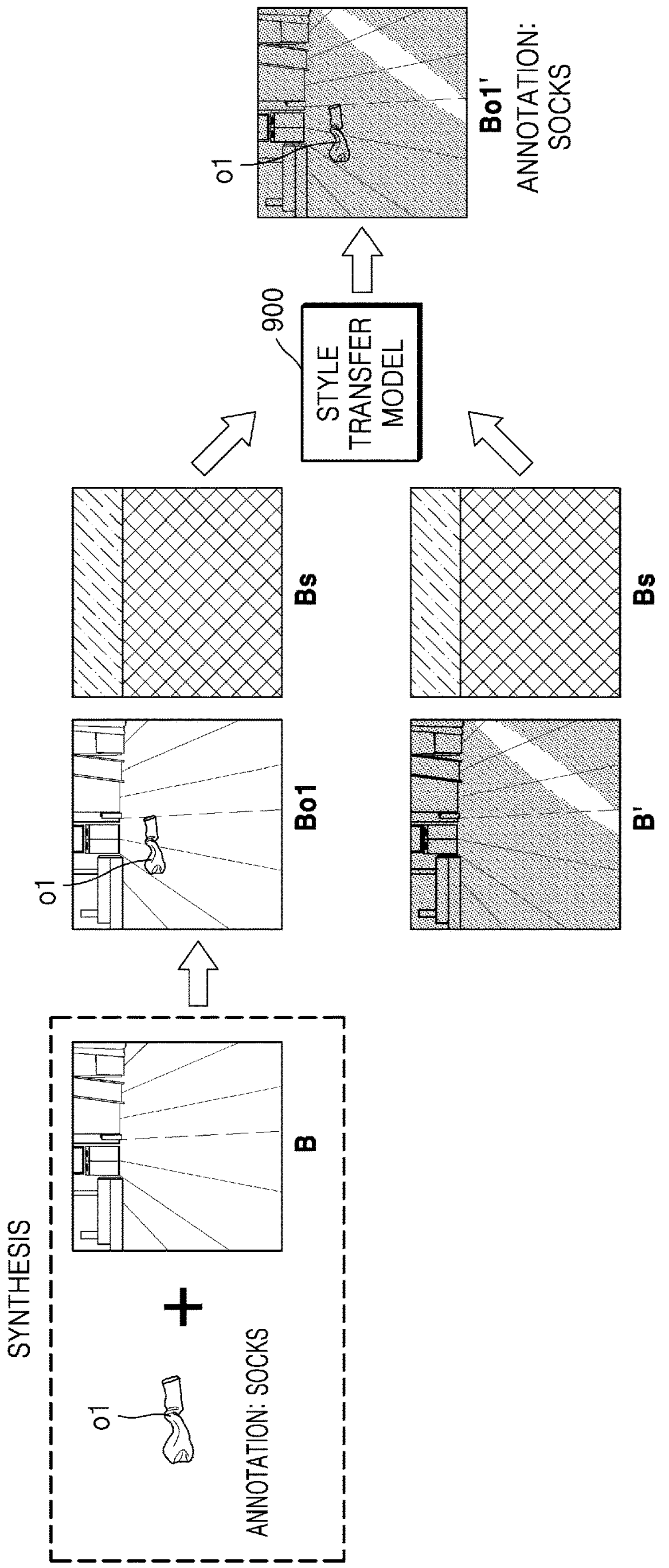

FIGS. 8 and 9 are diagrams illustrating a process of synthesizing an object with a content image and then performing a style transfer and generating training data according to various embodiments of the disclosure. As described above, when an object is already included in a content image, only an operation of synthesizing the object with the content image may be omitted from processes described with reference to FIGS. 8 and 9.

Referring to FIG. 8, a process of performing semantic segmentation on the content image B included in the selected image pair B and B' is described.

Referring to FIG. 8, when receiving an input of the content image B, a semantic segmentation model 800 may perform semantic segmentation to output a segmentation image Bs divided into a non-floor area 801 and a floor area 802. The obtained segmentation image Bs may be used when a style transfer is performed later. This is described with reference to FIG. 9 below.

The semantic segmentation model 800 may be a software configuration implemented when the processor 140 of the mobile terminal 100 executes a program stored in the memory 130. For example, an operation described to be performed by the semantic segmentation model 800 may actually be performed by the processor 140 of the mobile terminal 100.

Referring to FIG. 9, the mobile terminal 100 may generate a synthesis image Bo1 by synthesizing an object of with the content image B. At this time, it is assumed that an annotation "socks" has already been assigned to the object o1. The method of selecting the object of to be synthesized with the content image B may be implemented in various ways. According to an embodiment of the disclosure, the mobile terminal 100 may extract an object image stored in its own data base (DB) or a DB of another device (e.g., a cloud server, or the like) and synthesize the object image with the content image B. In addition, according to an embodiment of the disclosure, the mobile terminal 100 may synthesize an object with a low recognition accuracy (reliability), among objects recognized when the robot vacuum cleaner 200 performs a cleaning operation, with the content image B. This is described with reference to FIG. 11 below.

The mobile terminal 100 may synthesize the object of in an arbitrary area of the content image B, but according to an embodiment of the disclosure, the mobile terminal 100 may select which area of the content image B to synthesize with the object o1 based on an illumination difference for each area between the content image B and the style image B'. This is described with reference to FIGS. 12A and 12B below.

Alternatively, according to an embodiment of the disclosure, as described above, when the content image already includes an object, the operation of synthesizing the object with the content image may be omitted, and subsequent processes may be performed. For example, this is a case where the robot vacuum cleaner 200 obtains a content image, such as the synthesis image Bo1 of FIG. 9 from the beginning and transmit the content image to the mobile terminal 100. When an object is included in the content image from the beginning, it is necessary to perform an annotation on the object to generate training data. According to an embodiment of the disclosure, the mobile terminal 100 equipped with a relatively high-performance neural network model for object recognition compared to the robot vacuum cleaner 200 may perform the annotation.

According to an embodiment of the disclosure, the mobile terminal 100 may obtain a training image Bo1' by inputting the synthesis image Bo1 and the style image B' to a style transfer model 900. In this regard, the mobile terminal 100 may input the segmentation image Bs obtained according to the process described with reference to FIG. 8 to the style transfer model 900 for a style transfer.

According to the embodiment of the disclosure shown in FIG. 9, the segmentation image Bs generated from the content image B in FIG. 8 may be input not only as a segmentation image corresponding to the synthesis image Bo1 but also as a segmentation image corresponding to the style image B'. Because it is difficult to obtain an accurate result when semantic segmentation is performed because the overall illumination of the style image B' is too low, the segmentation image Bs obtained by performing semantic segmentation on the content image B is commonly used.

According to an embodiment of the disclosure, the style transfer model 900 may output a training image Bo1' by transferring a style of the style image B' to the synthesis image Bo1. Because the training image Bo1' includes the object of synthesized with the content image B, the same annotation ("socks") assigned to the object of may be assigned to the training image Bo1'. Alternatively, as described above, according to an embodiment of the disclosure, when the object is included in the content image from the beginning, the mobile terminal 100 may recognize the object included in the content image, and assign a recognition result as an annotation of the training image Bo1'.

The style transfer model 900 may be a software configuration implemented when the processor 140 of the mobile terminal 100 executes a program stored in the memory 130. For example, the operation described to be performed by the style transfer model 900 may actually be performed by the processor 140 of the mobile terminal 100.

Figure 10A:
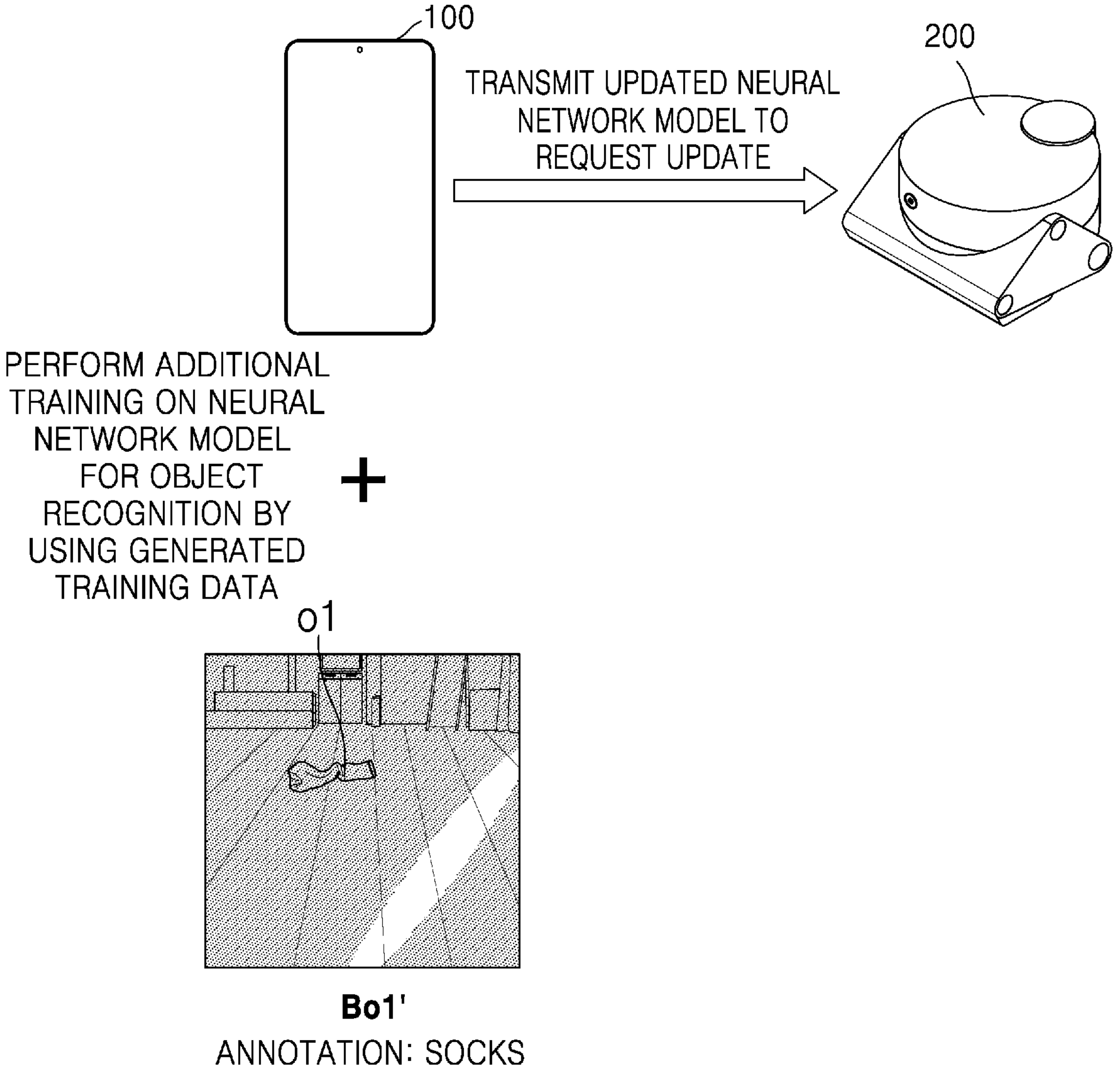
FIGS. 10A and 10B are diagrams illustrating a process of training a neural network model for object recognition by using generated training data according to various embodiments of the disclosure.
Figure 10B:
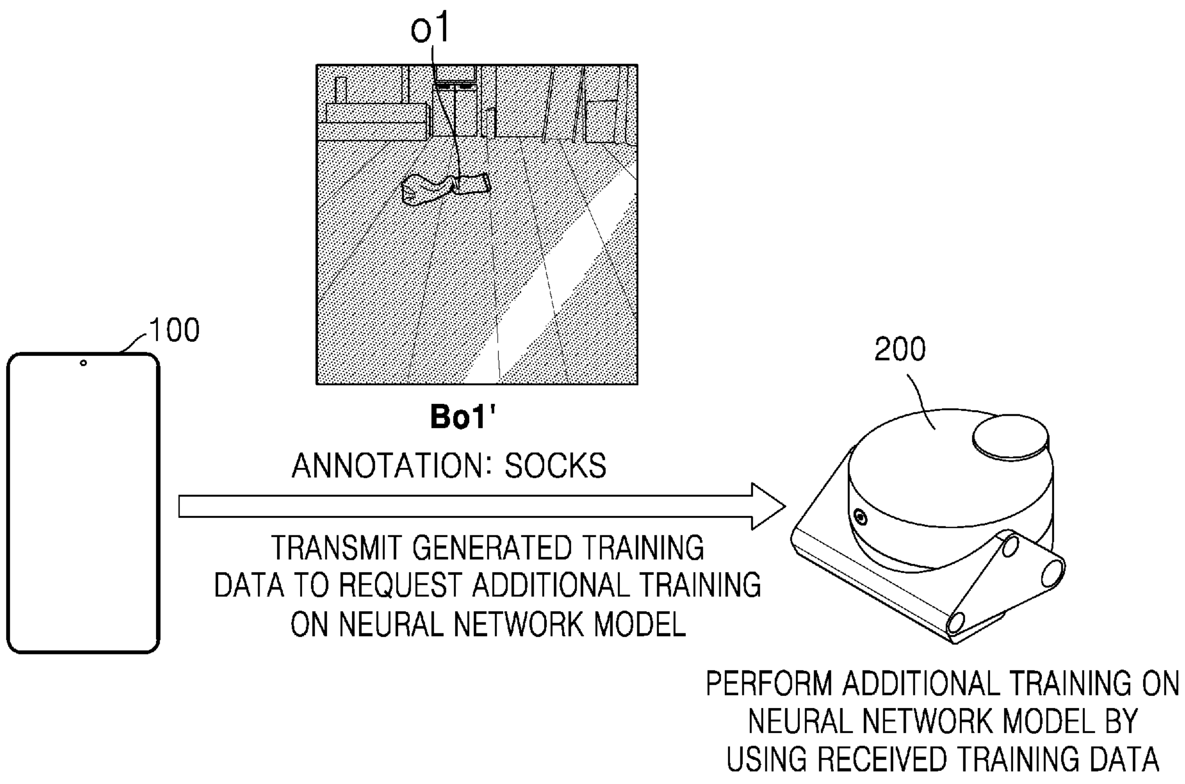

FIGS. 10A and 10B are diagrams illustrating a process of training a neural network model for object recognition by using generated training data according to various embodiments of the disclosure.

Referring FIG. 10A, the mobile terminal 100 performs additional training on the neural network model, and referring to FIG. 10B, the robot vacuum cleaner 200 performs additional training on the neural network model.

When the mobile terminal 100 generates the training data (training image) Bo1' according to the process described above, the mobile terminal 100 or the robot vacuum cleaner 200 may perform additional training on the neural network model by using the generated training data Bo1'.

Referring to FIG. 10A, the mobile terminal 100 may additionally train and update the neural network model for object recognition by using the generated training image Bo1', and then transmit the updated neural network model to the robot vacuum cleaner 200 to request an update. The robot vacuum cleaner 200 may update a previously mounted neural network model by using the neural network model received from the mobile terminal 100.

According to an embodiment of the disclosure, the mobile terminal 100 may perform additional training on the neural network model when a reliability (accuracy) of the neural network model installed in the robot vacuum cleaner 200 is lower than a certain reference as a result of recognizing an object. This is described with reference to FIG. 11 below.

According to an embodiment of the disclosure, the neural network model updated through additional training may correspond to a specific spot in a space. In this case, the spot corresponding to the neural network model updated through additional training may be a spot where an image used when generating training data used for additional training is captured. Details in this regard are as follows.

A neural network model additionally trained by using training data generated by using an image of a first spot captured among a plurality of spots in a space is referred to as a first neural network model, and a neural network model additionally trained by using training data generated by using an image of a second spot captured among the plurality of spots is referred to as a second neural network model, the first neural network model and the second neural network model correspond to the first spot and the second spot, respectively. Therefore, according to an embodiment of the disclosure, the robot vacuum cleaner 200 may use the first neural network model when recognizing an object at the first spot, and may also use the second neural network model when recognizing an object at the second spot during an operation (cleaning).

In addition, according to an embodiment of the disclosure, when additional training of the neural network model is performed a plurality of times, some of parameters included in the neural network model may be fixed, and only the remaining parameters may be changed whenever additional training is performed, and accordingly, the robot vacuum cleaner 200 may use the neural network model by fixing some parameters of the neural network model and changing only the remaining parameters for each spot including an object to be recognized.

According to the embodiment of the disclosure shown in FIG. 10B, the robot vacuum cleaner 200 instead of the mobile terminal 100 performs additional training on the neural network model. In general, because the performance of the processor 140 mounted in the mobile terminal 100 is superior to the performance of the processor 240 mounted in the robot vacuum cleaner 200, unless there are special circumstances, the mobile terminal 100 performs additional training on the neural network model as in the embodiment of the disclosure shown in FIG. 10A, but the robot vacuum cleaner 200 may perform additional training depending on circumstances.

Referring to FIG. 10B, the mobile terminal 100 may transmit the generated training image Bo1' to the robot vacuum cleaner 200 and request additional training of the neural network model, and the robot vacuum cleaner 200 may perform additional training of the neural network model by using the received training image Bo1'.

Figure 11:
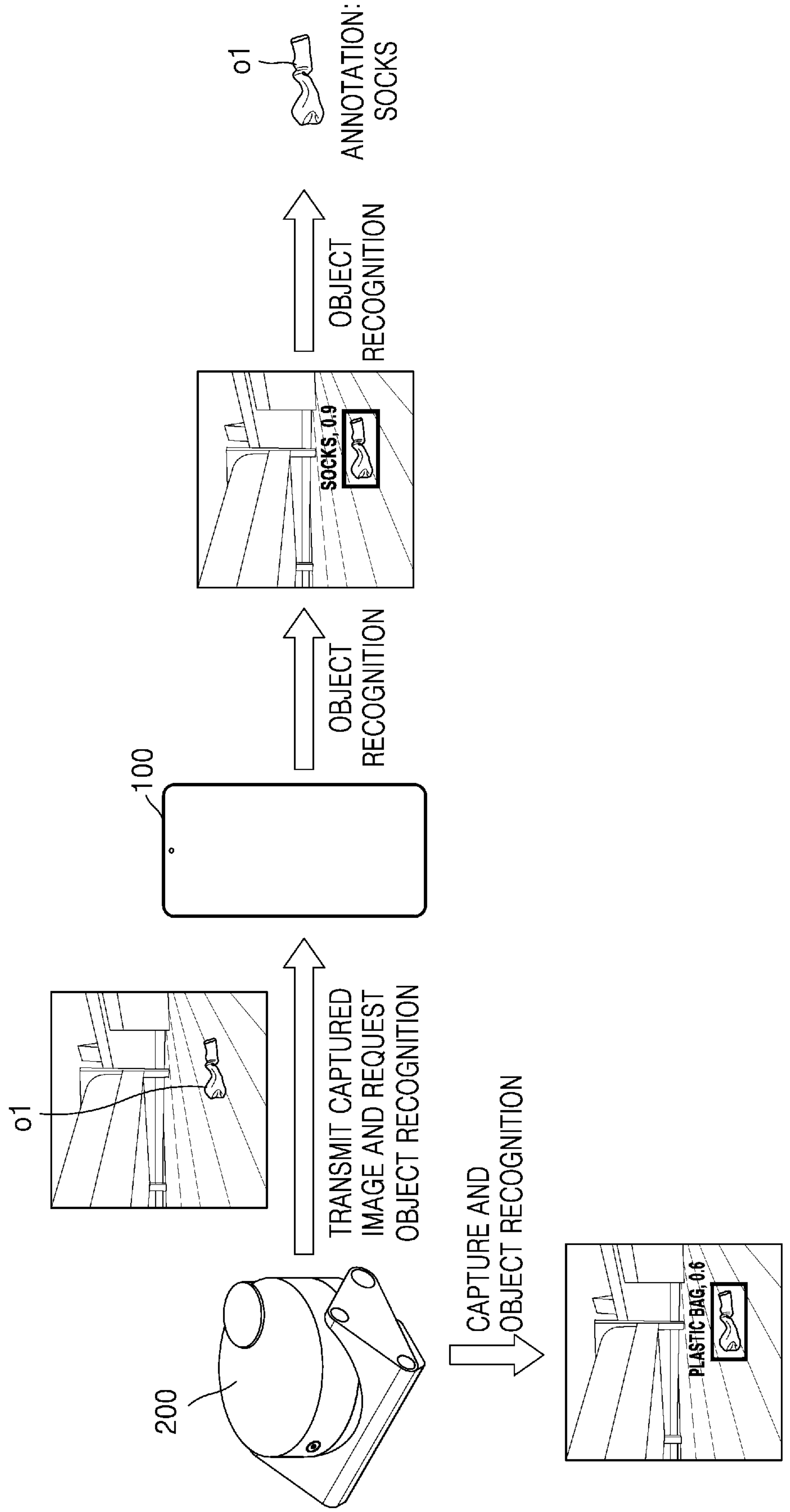
FIG. 11 is a diagram illustrating a method of selecting an object to be synthesized with a content image according to an embodiment of the disclosure.

FIG. 11 is a diagram illustrating a method of selecting an object to be synthesized with a content image according to an embodiment of the disclosure.

Referring to FIG. 11, the robot vacuum cleaner 200 captures surroundings by performing a cleaning operation, and recognizes an object included in a captured image. In the embodiment of the disclosure shown in FIG. 11, a neural network model mounted on the robot vacuum cleaner 200 recognizes an object included in an image captured at a specific time as "plastic bag". At this time, the neural network model of the robot vacuum cleaner 200 outputs that a reliability of an object recognition result (inference result) is 0.6.

According to an embodiment of the disclosure, the robot vacuum cleaner 200 may recognize various objects by performing the cleaning operation, transmit a captured image including an object to the mobile terminal 100 when the reliability of the recognition result is lower than a preset reference, and request an object recognition and an annotation assignment.

In addition, according to an embodiment of the disclosure, the robot vacuum cleaner 200 may recognize various objects by performing the cleaning operation, may determine that additional training of the neural network model is required when the reliability of the recognition result is lower than a preset reference, and perform a process for additional training (e.g., transmit captured images for generating training data to the mobile terminal 100).

In the embodiment of the disclosure shown in FIG. 11, it is assumed that when the reliability of the object recognition result is 0.7 or less, the robot vacuum cleaner 200 determines that additional training is required or the object is used when generating the training data. Because a reliability which is 0.6 of a result of recognizing the object of as "plastic bag" is lower than a reference value which is 0.7, the robot vacuum cleaner 200 may determine that additional training is required, and transmit a captured image including the object o1 to the mobile terminal 100 to request the object recognition.

According to an embodiment of the disclosure, the neural network model mounted on the mobile terminal 100 recognizes the object of included in the captured image received from the robot vacuum cleaner 200 as "socks", and outputs a result that the reliability of the recognition result is 0.9.

Because the result of the object recognition ("socks") in the mobile terminal 100 shows a high reliability, the mobile terminal 100 may segment and extract the object o1 from the captured image, and assign an annotation "socks" to the extracted object o1. The image of the object of with the assigned annotation may be used for synthesizing with the content image B as described above with reference to FIG. 9.

Figure 12A:
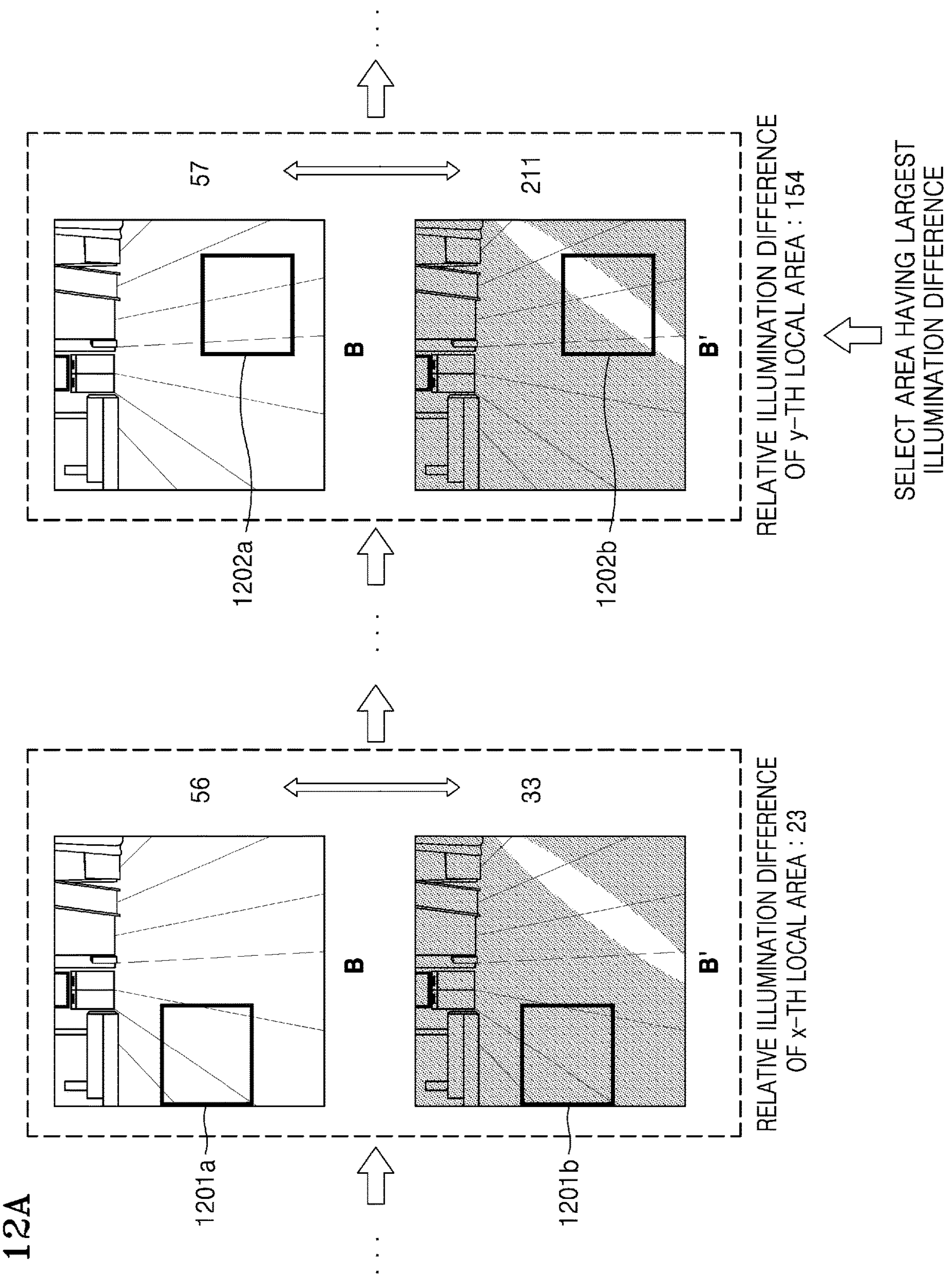
FIGS. 12A and 12B are diagrams illustrating a method of selecting an area of a content image with which an object is to be synthesized according to various embodiments of the disclosure.
Figure 12B:
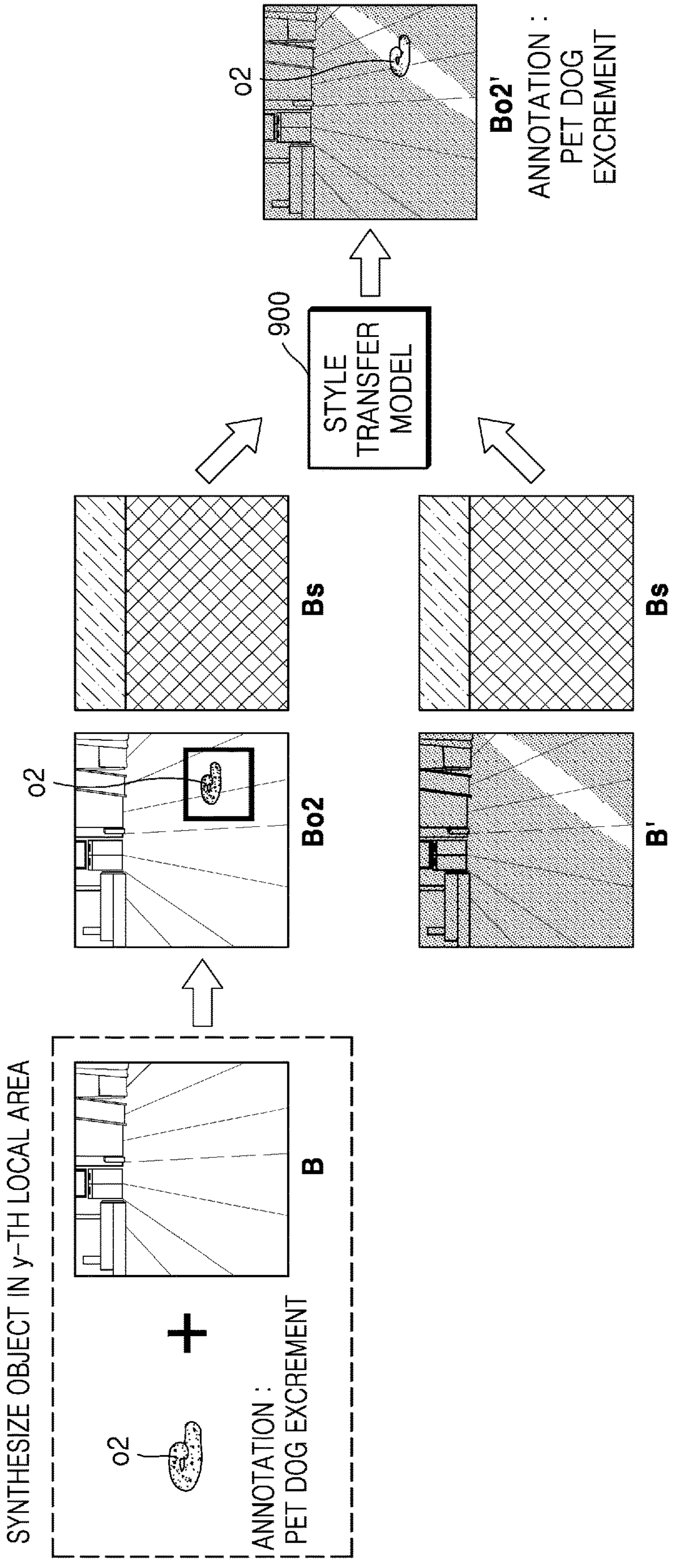

FIGS. 12A and 12B are diagrams illustrating a method of selecting an area of a content image with which an object is to be synthesized according to various embodiments of the disclosure.

According to an embodiment of the disclosure, the mobile terminal 100 may calculate an illumination difference for each area with respect to the content image B and the style image B' included in the same image pair. According to an embodiment of the disclosure, the mobile terminal 100 may divide the content image B and the style image B' into a plurality of areas (e.g., a first local area to an $N^{th}$ local area), and calculate an illumination difference between the content image B and the style image B' of each of the divided plurality of areas.

FIG. 12A illustrates an example in which the mobile terminal 100 calculates the illumination difference between x-th local areas 1201$a$ and 1201$b$ and y-th local areas 1202$a$ and 1202$b$. According to an embodiment of the disclosure, the mobile terminal 100 may convert each of the content image B and the style image B' into a grayscale image, and then calculate the illumination difference for each area.

A process in which the mobile terminal 100 calculates the illumination difference between the x-$^{th}$ local areas 1201$a$ and 1201$b$ is described as follows. The mobile terminal 100 calculates an average 56 of values of pixels included in the x-$^{th}$ local area 1201$a$ of the content image B. Subsequently, the mobile terminal 100 calculates an average 33 of values of pixels included in the x-$^{th}$ local area 1201$b$ of the style image B'. The mobile terminal 100 calculates a difference 23 in the averages 56 and 33 of values of pixels between the content image B and the style image B' of the x-$^{th}$ local areas 1201$a$ and 1201$b$.

A process in which the mobile terminal 100 calculates the illumination difference between the y-$^{th}$ local areas 1202$a$ and 1202$b$ is described as follows. The mobile terminal 100 calculates an average 57 of values of pixels included in the y-$^{th}$ local area 1202$a$ of the content image B. Subsequently, the mobile terminal 100 calculates an average 211 of values of pixels included in the y-$^{th}$ local area 1202$b$ of the style image B'. The mobile terminal 100 calculates a difference 154 in the averages 57 and 211 of values of pixels between the content image B and the style image B' of the y-$^{th}$ local areas 1202$a$ and 1202$b$.

The mobile terminal 100 may calculate the illumination difference between the content image B and the style image B' of the first to $N^{th}$ local areas in the same manner, and select an area having the largest illumination difference as an area with which the object is to be synthesized.

As described above, the object is synthesized with the area where the illumination difference between the content image B and the style image B' is the largest, and thus, training data under conditions in which object recognition is difficult may be generated, thereby improving the performance of the neural network model.

FIG. 12B illustrates an embodiment of the disclosure in which training data is generated by synthesizing an object with an area selected through the process shown in FIG. 12A.

Referring to FIG. 12B, the mobile terminal 100 may generate a synthesis image Bo2 by synthesizing an object o2 with the y-th local area 1202$a$ of the content image B. At this time, it is assumed that an annotation "pet dog excrement" has already been assigned to the object o2. As described above, the object o2 to be synthesized with the content image B may be an object image stored in a DB of the mobile terminal 100 or a DB of another device (e.g., a cloud server, or the like), or may be an object with a low recognition accuracy (reliability) among objects recognized when the robot vacuum cleaner 200 performs a cleaning operation.

According to an embodiment of the disclosure, the mobile terminal 100 may obtain a training image Bo2' by inputting the synthesized image Bo2 and the style image B' to the style transfer model 900. In this regard, the mobile terminal 100 may input the segmentation image Bs obtained according to the process described with reference to FIG. 8 to the style transfer model 900 for a style transfer.

According to the embodiment of the disclosure shown in FIG. 12B, the segmentation image Bs generated from the content image B in FIG. 8 may be input not only as a segmentation image corresponding to the synthesis image Bo2 but also as a segmentation image corresponding to the style image B'. Because it is difficult to obtain an accurate result when semantic segmentation is performed because the overall illumination of the style image B' is too low, the segmentation image Bs obtained by performing semantic segmentation on the content image B is commonly used.

According to an embodiment of the disclosure, the style transfer model 900 may output a training image Bo2' by transferring a style of the style image B' to the synthesized image Bo2. Because the training image Bo2' includes the object o2 synthesized with the content image B, the annotation ("pet dog excrement") assigned to the object o2 may be assigned to the training image Bo2'.

FIGS. 13, 14, 15, 16, 17, and 18 are flowcharts illustrating a method of training an object recognition model by using spatial information according to embodiments of the disclosure. Hereinafter, the method of training the object recognition model by using the spatial information according to various embodiments of the disclosure is described with reference to FIGS. 13 to 18. Because operations described below are performed by the mobile terminal 100 or the robot vacuum cleaner 200 described above, the descriptions included in the embodiments of the disclosure provided above may be equally applicable even when omitted below.

Figure 13:
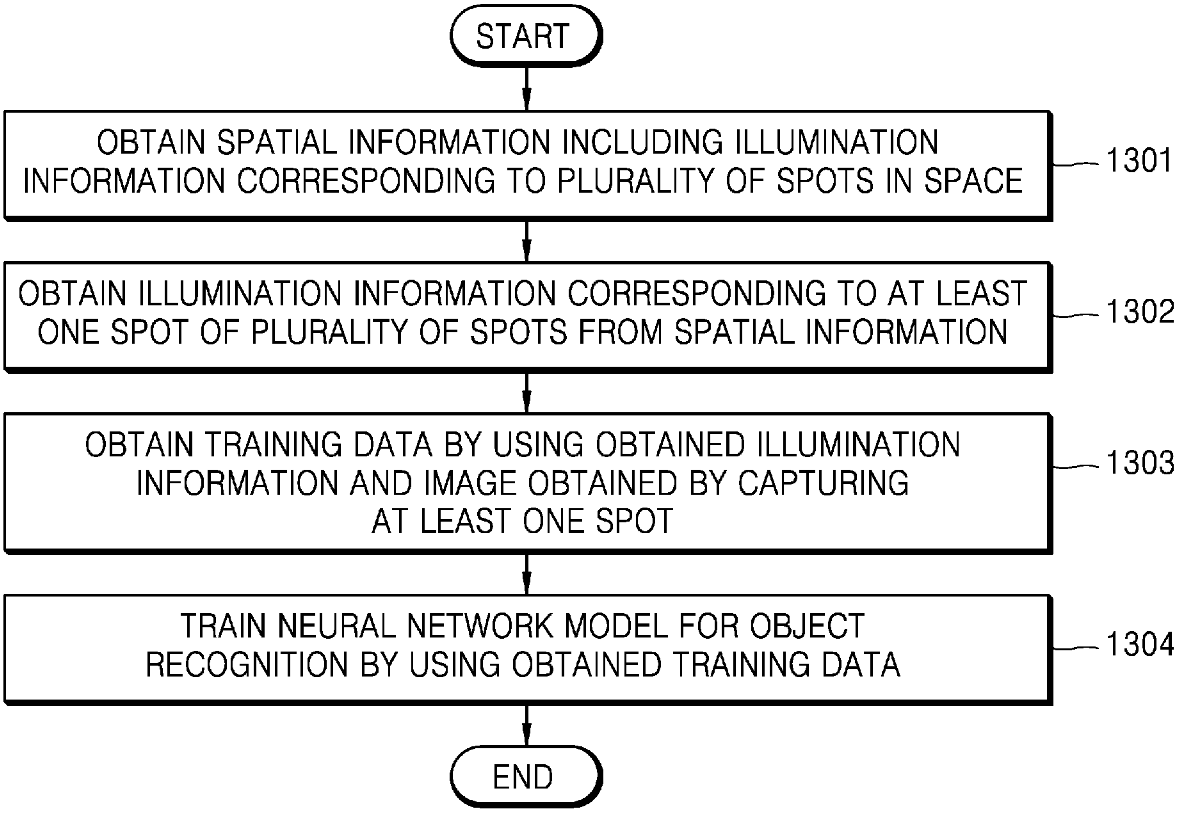
FIGS. 13, 14, 15, 16, 17, and 18 are flowcharts illustrating a method of training an object recognition model by using spatial information according to various embodiments of the disclosure.

Referring to FIG. 13, in operation 1301, the mobile terminal 100 may obtain spatial information including illumination information corresponding to a plurality of spots in a space. Detailed operations included in operation 1301 are illustrated in FIG. 14.

Figure 14:
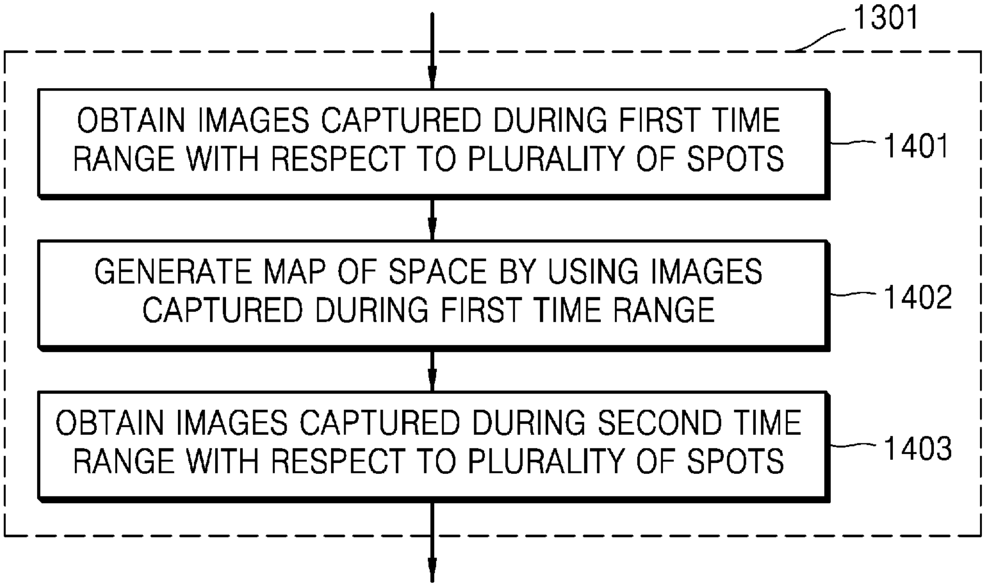

Referring to FIG. 14, in operation 1401, the mobile terminal 100 may obtain images of the plurality of spots captured during a first time range. According to an embodiment of the disclosure, the mobile terminal 100 may receive images captured by the robot vacuum cleaner 200 during spatial modeling.

In operation 1402, the mobile terminal 100 may generate a map of the space by using the images captured during the first time range.

In operation 1403, the mobile terminal 100 may obtain images of the plurality of spots captured during a second time range. According to an embodiment of the disclosure, the mobile terminal 100 may receive images captured by the robot vacuum cleaner 200 during a cleaning operation.

Locations where capturing is performed during the first time range are recorded on the map and then referenced when capturing is performed during the second time range, so that the images captured during the first time range and the images captured during the second time range may match each other in capturing spots.

Returning to FIG. 13 again, in operation 1302, the mobile terminal 100 may obtain illumination information corresponding to at least one spot of the plurality of spots from the spatial information. Detailed operations included in operation 1302 are illustrated in FIG. 15.

Figure 15:
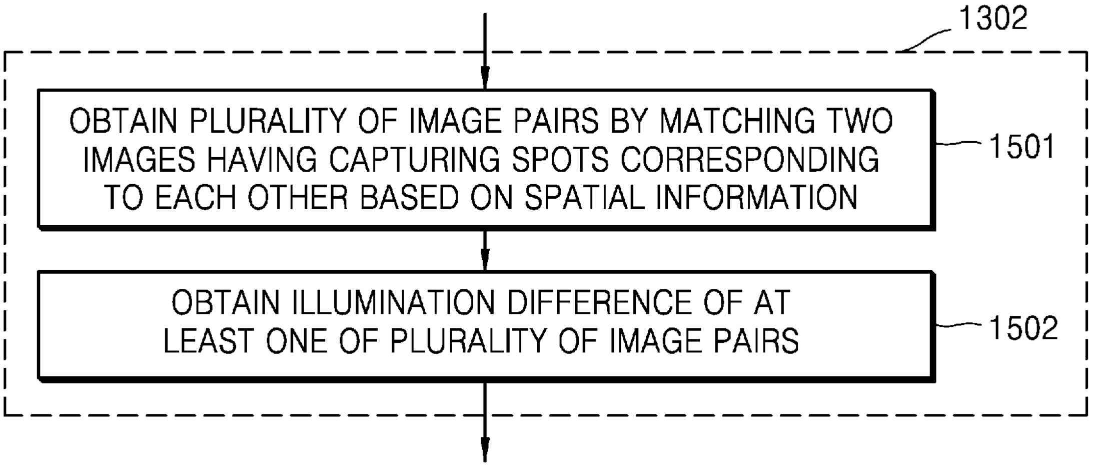

Referring to FIG. 15, in operation 1501, the mobile terminal 100 may obtain a plurality of image pairs by matching two images having capturing spots corresponding to each other based on the spatial information. In operation 1502, the mobile terminal 100 may obtain an illumination difference of at least one of the plurality of image pairs. In other words, the mobile terminal 100 may calculate the illumination difference between two images included in the at least one image pair among the plurality of image pairs.

Returning to FIG. 13 again, in operation 1303, the mobile terminal 100 may obtain training data by using the obtained illumination information and an image obtained by capturing the at least one spot. Detailed operations included in operation 1303 are illustrated in FIG. 16.

Figure 16:
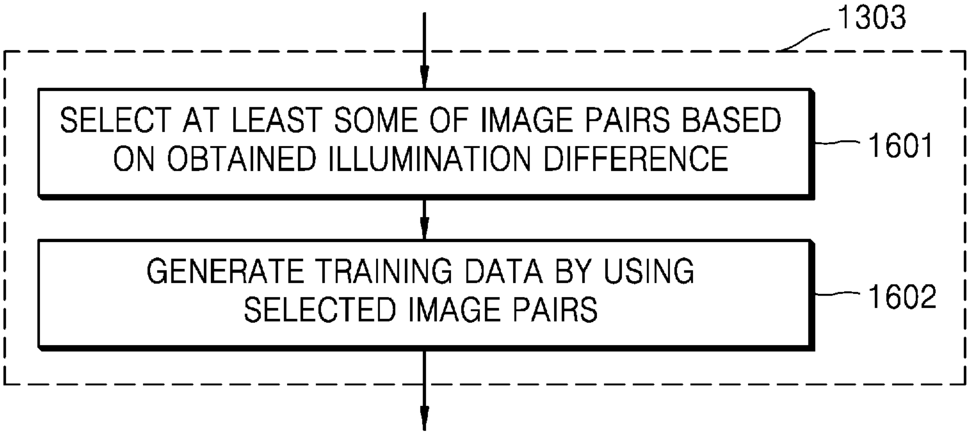

Referring to FIG. 16, in operation 1601, the mobile terminal 100 may select at least some of the image pairs based on the obtained illumination difference. According to an embodiment of the disclosure, the mobile terminal 100 may assign priority to the image pairs in ascending order of an illumination difference, and select a certain number of image pairs having a high priority.

In operation 1602, the mobile terminal 100 may generate the training data by using the selected image pairs. Detailed operations included in operation 1602 are illustrated in FIG. 17.

Figure 17:
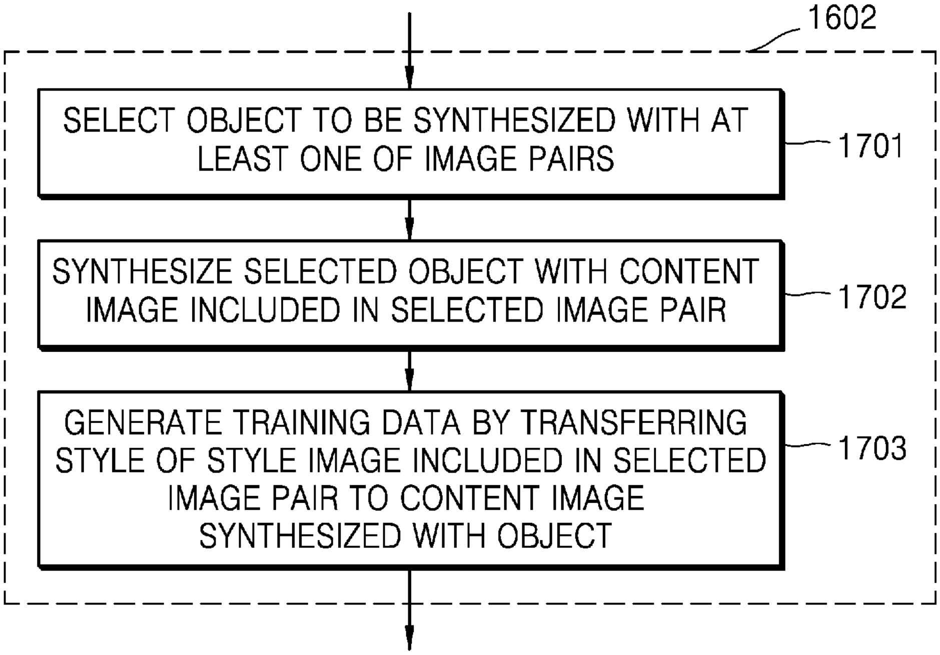

Referring to FIG. 17, in operation 1701, the mobile terminal 100 may select an object to be synthesized with at least one of the image pairs. According to an embodiment of the disclosure, the mobile terminal 100 may select an object from its own DB or a DB of another device, or may select an object having a recognition accuracy (reliability) which does not meet a certain reference from among objects recognized when the robot vacuum cleaner 200 performs the cleaning operation.

In operation 1702, the mobile terminal 100 may synthesize the selected object with a content image included in the selected image pair. According to an embodiment of the disclosure, the mobile terminal 100 may synthesize the object in an arbitrary area on the content image. Alternatively, according to an embodiment of the disclosure, the mobile terminal 100 may select an area with which the object is to be synthesized on the content image based on an illumination difference for each area between the content image and a style image, and synthesize the object with the selected area. An embodiment of the disclosure in this regard is shown in FIG. 18.

Figure 18:
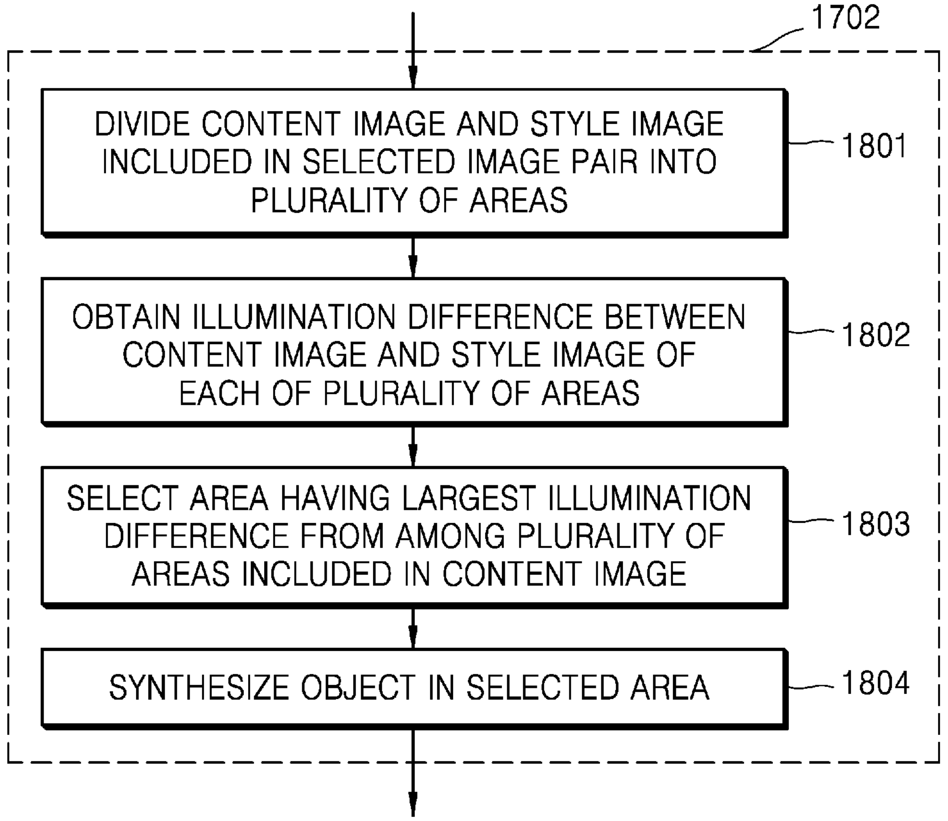

Referring to FIG. 18, in operation 1801, the mobile terminal 100 may divide a content image and a style image included in the selected image pair into a plurality of areas. In operation 1802, the mobile terminal 100 obtains an illumination difference between the content image and the style image of each of the plurality of areas. In operation 1803, the mobile terminal 100 selects an area having the largest illumination difference from among the plurality of areas included in the content image. In operation 1804, the mobile terminal 100 synthesizes the object with the selected area.

Returning to FIG. 17 again, in operation 1703, the mobile terminal 100 may generate the training data by transferring a style of the style image included in the selected image pair to the content image synthesized with the object.

Returning to FIG. 13 again, in operation 1304, the mobile terminal 100 may train the neural network model for object recognition by using the obtained training data.

According to embodiments of the disclosure described above, the neural network model for object recognition is trained by using the spatial information, thereby improving an object recognition accuracy by reflecting a special situation for each space (e.g., a situation where there is a significant illumination difference by time or a situation where a specific object is often found).

According to an embodiment of the disclosure, a method of training an object recognition model by using spatial information may include obtaining the spatial information including illumination information corresponding to a plurality of spots in a space, obtaining illumination information corresponding to at least one of the plurality of spots from the spatial information, obtaining training data by using the obtained illumination information and an image obtained by capturing the at least one spot, and training a neural network model for object recognition by using the training data.

According to an embodiment of the disclosure, the obtaining of the spatial information may include obtaining images of the plurality of spots captured during a first time range, generating a map of the space by using images captured during the first time range, and obtaining images of the plurality of spots captured during a second time range.

According to an embodiment of the disclosure, a plurality of locations where capturing may be performed during the first time range are recorded on the map, and the images captured during the second time range may be images captured during the second time range at the plurality of locations recorded on the map.

According to an embodiment of the disclosure, the obtaining of the illumination information may include obtaining a plurality of image pairs by matching two images having capturing spots corresponding to each other based on the spatial information, and obtaining an illumination difference of at least one of the plurality of image pairs.

According to an embodiment of the disclosure, the obtaining of the training data may include selecting at least some of the plurality of image pairs based on the obtained illumination difference, and generating the training data by using the selected at least some image pairs.

According to an embodiment of the disclosure, the obtaining of the training data may include generating the training data by performing a style transfer after synthesizing an object with at least one of the selected at least some image pairs.

According to an embodiment of the disclosure, when the images captured during the first time range are referred to as content images and the images captured during the second time range are referred to as style images, the generating of the training data by using the selected at least some image pairs may include selecting an object to be synthesized with at least one of the selected at least some image pairs, synthesizing the selected object with a content image included in the at least one image pair, and generating the training data by transferring a style of a style image included in the at least one image pair to the content image synthesized with the object.

According to an embodiment of the disclosure, the training of the neural network model may include additionally training the neural network model by using the generated training data after the neural network model is firstly trained, and selecting of the object to be synthesized with the at least one image pair may include, as a result of recognizing a plurality of objects by using the firstly trained neural network model, selecting at least one object having a recognition accuracy is lower than a preset reference.

According to an embodiment of the disclosure, a result of recognizing the object synthesized with the content image by using a neural network model having a higher recognition accuracy than the firstly trained neural network model may be annotated in the training data.

According to an embodiment of the disclosure, the synthesizing of the selected object with the content image may include dividing each of the content image and the style image included in the at least one image pair into a plurality of areas, obtaining an illumination difference between the content image and the style image of each of the plurality of areas, selecting an area having a largest illumination difference from among the plurality of areas included in the content image, and synthesizing the object with the selected area.

According to an embodiment of the disclosure, the selecting of the at least some of the plurality of image pairs may include assigning a priority to the plurality of image pairs in ascending order of the obtained illumination difference, and selecting a preset number of image pairs in ascending order of the priority.

According to an embodiment of the disclosure, the obtaining of the illumination difference may include dividing images included in the plurality of image pairs into a plurality of areas, obtaining a pixel value difference between two images of each of the plurality of areas as a local illumination difference, and obtaining an average of the local illumination difference with respect to each of the images as a global illumination difference, and the plurality of areas may overlap each other.

According to an embodiment of the disclosure, the images captured during the first time range may be images obtained by capturing the plurality of spots when a robotic mobile device moves during modeling of a surrounding environment, and the images captured during the second time range may be images obtained by capturing the plurality of spots when the robotic mobile device moves during an operation.

According to an embodiment of the disclosure, the spatial information may be the map of the space, illumination information corresponding to each of a plurality of areas included in the map may be stored in the map, the obtaining of the training data may include determining an area to which the at least one spot belongs in the map, obtaining illumination information corresponding to the determined area from the map, and changing a style of an image obtained by capturing the at least one spot by using the obtained illumination information.

According to an embodiment of the disclosure, at least some of parameters included in the neural network model may be different from each other for each of the plurality of spots, the training of the neural network mode may include additionally training the neural network model by using the generated training data after the neural network model is firstly trained, and the additionally trained neural network model may correspond to a spot where an image used for generating of the training data used during additional training is captured.

According to an embodiment of the disclosure, a computing device for performing a method of training an object recognition model by using spatial information may include a memory storing a program for training a neural network model, and at least one processor configured to execute the program to obtain spatial information including illumination information corresponding to a plurality of spots in a space, obtain illumination information corresponding to at least one of the plurality of spots from the spatial information, and obtain training data by using the obtained illumination information and an image obtained by capturing the at least one spot, and train the neural network model for object recognition by using the training data.

According to an embodiment of the disclosure, the at least one processor may, when obtaining the spatial information, obtain images of the plurality of spots captured during a first time range, generate a map of the space by using images captured during the first time range, and obtain images of the plurality of spots captured during a second time range.

According to an embodiment of the disclosure, the at least one processor may, when obtaining the illumination information, obtain a plurality of image pairs by matching two images having capturing spots corresponding to each other based on the spatial information, and obtain an illumination difference of at least one of the plurality of image pairs.

According to an embodiment of the disclosure, the at least one processor may, when obtaining the training data, select at least some of the plurality of image pairs based on the obtained illumination difference, and generate the training data by using the selected at least some image pairs.

Various embodiments of the disclosure may be implemented or supported by one or more computer programs, each of which is formed from computer-readable program code and embodied in a computer-readable medium. The terms "application" and "program" used herein refer to one or more computer programs, software components, sets of instructions, procedures, functions, objects, classes, instances, related data, or a portion thereof adapted for implementation in suitable computer-readable program code. The phrase "computer-readable program code" includes any type of computer code, including source code, object code, and executable code. The phrase "computer-readable medium" may include any type of medium capable of being accessed by a computer, such as a read-only memory (ROM), a random-access memory (RAM), a hard disk drive, a compact disc (CD), a digital video disc (DVD), or any other type of memory.

In addition, a machine-readable storage medium may be provided as a non-transitory storage medium. A 'non-transitory storage medium' is a tangible device, and may exclude wired, wireless, optical, or other communication links that transmit transitory electrical or other signals. The 'non-transitory storage medium' does not distinguish a case in which data is stored semi-permanently in a storage medium from a case in which data is temporarily stored. For example, the 'non-transitory storage medium' may include a buffer in which data is temporarily stored. A computer readable medium may be any available medium which may be accessed by the computer and includes all volatile/non-volatile and removable/non-removable media. A computer-readable medium includes media where data may be permanently stored and media where data may be stored and later overwritten, such as a rewritable optical disc or an erasable memory device.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., a compact disc read only memory (CD-ROM)), or may be distributed (e.g., downloaded or uploaded) through an application store or between two user devices (e.g., smartphones) directly and online. In the case of online distribution, at least a part of the computer program product (e.g., a downloadable app) may be stored at least temporarily in a device-readable storage medium, such as a memory of a manufacturer's server, a server of an application store, or a relay server, or may be temporarily generated.

While the disclosure has been particularly shown and described with reference to embodiments thereof, it will be understood that various changes in form and details may be made therein without departing from the spirit and scope of the disclosure. For example, the described techniques may be performed in a different order from the described method, and/or the described elements, such as a system, structure, device, or circuit may be combined or integrated in a different form from the described method, or may be replaced or substituted by other elements or equivalents to achieve appropriate results. Thus, the above-described embodiments should be considered in descriptive sense only and not for purposes of limitation. For example, each component described as a single type may be implemented in a distributed manner, and similarly, components described as being distributed may be implemented in a combined form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device of training an object recognition model by using spatial information, the method comprising:

obtaining, by the electronic device, the spatial information including illumination information corresponding to a plurality of spots in a space, wherein the illumination information includes information related to brightness of the plurality of spots;

obtaining, by the electronic device, at least one piece of the illumination information corresponding to at least one spot of the plurality of spots from the spatial information, wherein the at least one piece of the illumination information includes an illumination difference obtained between at least two images included in at least one image pair, wherein the at least one image pair is obtained by matching images obtained by capturing a same spot among the plurality of spots at different times;

obtaining, by the electronic device, training data by using the obtained at least one piece of the illumination information and an image obtained by capturing the at least one spot; and training, by the electronic device, a neural network model for object recognition by using the training data.

2. The method of claim 1, wherein the obtaining of the spatial information includes:

obtaining, by the electronic device, images of the plurality of spots captured during a first time range;

generating, by the electronic device, a map of the space by using the images captured during the first time range; and obtaining, by the electronic device, images of the plurality of spots captured during a second time range.

3. The method of claim 2, wherein a plurality of locations where capturing is performed during the first time range are recorded on the map, and wherein the images captured during the second time range are captured during the second time range at the plurality of locations recorded on the map.

4. The method of claim 2, wherein the obtaining of the at least one piece of the illumination information includes:

obtaining, by the electronic device, a plurality of image pairs by matching two images having capturing spots corresponding to each other based on the spatial information; and obtaining, by the electronic device, an illumination difference of at least one of the plurality of image pairs.

5. The method of claim 4, wherein the obtaining of the training data includes:

selecting, by the electronic device, at least some of the plurality of image pairs based on the obtained illumination difference; and generating, by the electronic device, the training data by using the selected at least some of the plurality of image pairs.

6. The method of claim 5, wherein the obtaining of the training data further includes:

generating, by the electronic device, the training data by performing a style transfer after synthesizing an object with at least one of the selected at least some of the plurality of image pairs.

7. The method of claim 6, wherein, when the images captured during the first time range are referred to as content images and the images captured during the second time range are referred to as style images, the generating of the training data by using the selected at least some of the plurality of image pairs includes:

selecting, by the electronic device, an object to be synthesized with at least one image pair of the selected at least some of the plurality of image pairs;

synthesizing, by the electronic device, the object with a content image included in the at least one image pair; and generating, by the electronic device, the training data by transferring a style of a style image included in the at least one image pair to the content image synthesized with the object.

8. The method of claim 7, wherein the training of the neural network model includes additionally training the neural network model by using generated training data after the neural network model is firstly trained, and wherein the selecting of the object to be synthesized includes:

as a result of recognizing a plurality of objects by using the firstly trained neural network model, selecting, by the electronic device, at least one object having a recognition accuracy being lower than a preset reference.

9. The method of claim 8, wherein a result of recognizing the object synthesized with the content image by using at least one neural network model having a higher recognition accuracy than the firstly trained neural network model is annotated in the training data.

10. The method of claim 7, wherein the synthesizing of the object with the content image includes:

dividing, by the electronic device, each of the content image and the style image included in the at least one image pair into a plurality of areas;

obtaining, by the electronic device, an illumination difference between the content image and the style image of each of the plurality of areas;

selecting, by the electronic device, an area having a largest illumination difference from among the plurality of areas included in the content image; and synthesizing, by the electronic device, the object with the selected area.

11. The method of claim 5, wherein the selecting of the at least some of the plurality of image pairs includes:

assigning, by the electronic device, a priority to the plurality of image pairs in ascending order of the obtained illumination difference; and selecting, by the electronic device, a preset number of image pairs in ascending order of the priority.

12. The method of claim 5, wherein the obtaining of the illumination difference includes:

dividing, by the electronic device, images included in the plurality of image pairs into a plurality of areas;

obtaining, by the electronic device, a pixel value difference between two images of each of the plurality of areas as a local illumination difference; and obtaining, by the electronic device, an average of the local illumination difference with respect to each of the images included in the plurality of image pairs as a global illumination difference, and wherein the plurality of areas overlap each other.

13. The method of claim 5, wherein the images captured during the first time range are obtained by capturing the plurality of spots when a robotic mobile device moves during modeling of a surrounding environment, and wherein the images captured during the second time range are obtained by capturing the plurality of spots when the robotic mobile device moves during an operation different from the modeling of the surrounding environment.

14. The method of claim 1, wherein the spatial information includes a map of the space, wherein area illumination information corresponding to each of a plurality of areas included in the map is stored in the map, and wherein the obtaining of the training data includes:

determining, by the electronic device, an area to which the at least one spot belongs in the map;

obtaining, by the electronic device, at least one piece of the area illumination information corresponding to the determined area from the map; and changing, by the electronic device, a style of an image obtained by capturing the at least one spot by using the obtained at least one piece of the area illumination information.

15. The method of claim 1, wherein at least some of parameters included in the neural network model are different from each other for each of the plurality of spots, wherein the training of the neural network model includes additionally training the neural network model by using generated training data after the neural network model is firstly trained, and wherein the additionally trained neural network model corresponds to a spot where an image used for generating of the training data used during the additional training is captured.

16. One or more non-transitory computer-readable storage media storing computer-executable instructions that, when executed by at least one processor of an electronic device individually or collectively, cause the electronic device to perform operations comprising:

obtaining, by the electronic device, spatial information including illumination information corresponding to a plurality of spots in a space, wherein the illumination information includes information related to brightness of the plurality of spots;

obtaining, by the electronic device, at least one piece of the illumination information corresponding to at least one of the plurality of spots from the spatial information, wherein the at least one piece of the illumination information includes an illumination difference obtained between at least two images included in at least one image pair, wherein the at least one image pair is obtained by matching images obtained by capturing a same spot among the plurality of spots at different times;

obtaining, by the electronic device, training data by using the obtained at least one piece of the illumination information and an image obtained by capturing at least one spot of the plurality of spots; and training, by the electronic device, a neural network model for object recognition by using the training data.

17. A computing device comprising:

memory, comprising one or more storage media, storing instructions and a program for training a neural network model; and at least one processor communicatively coupled to the memory, wherein the instructions, when executed by the at least one processor individually or collectively, cause the computing device to:

obtain spatial information including illumination information corresponding to a plurality of spots in a space, wherein the illumination information includes information related to brightness of the plurality of spots, obtain at least one piece of the illumination information corresponding to at least one spot of the plurality of spots from the spatial information, wherein the at least one piece of the illumination information includes an illumination difference obtained between at least two images included in at least one image pair, wherein the at least one image pair is obtained by matching images obtained by capturing a same spot among the plurality of spots at different times, obtain training data by using the obtained at least one piece of the illumination information and an image obtained by capturing the at least one spot, and train the neural network model for object recognition by using the training data.

18. The computing device of claim 17, wherein the instructions, when executed by the at least one processor individually or collectively, further cause the computing device to, when obtaining the spatial information:

obtain images of the plurality of spots captured during a first time range, generate a map of the space by using the images captured during the first time range, and obtain images of the plurality of spots captured during a second time range.

19. The computing device of claim 18, wherein the instructions, when executed by the at least one processor individually or collectively, further cause the computing device to, when obtaining the at least one piece of the illumination information:

obtain a plurality of image pairs by matching two images having capturing spots corresponding to each other based on the spatial information, and obtain an illumination difference of at least one of the plurality of image pairs.

20. The computing device of claim 19, wherein the instructions, when executed by the at least one processor individually or collectively, further cause the computing device to, when obtaining the training data:

select at least some of the plurality of image pairs based on the obtained illumination difference, and generate the training data by using the selected at least some of the plurality of image pairs.

* * * * *